United States Patent
Spell et al.

(10) Patent No.: US 6,208,640 B1
(45) Date of Patent: Mar. 27, 2001

(54) PREDICTIVE BANDWIDTH ALLOCATION METHOD AND APPARATUS

(76) Inventors: David Spell, 2655 Tennyson St., Denver, CO (US) 80212; Dave Roland, 8205 S. Poplar Way, #301, Englewood, CO (US) 80126; Ajay Rai, 1020 15th St., Apt. 24K, Denver, CO (US) 80202; Dale Ellis, 734 Spring Ranch Dr., Golden, CO (US) 80401; Yukihiro Mikami, 107-12 Hirooka Kataishi, Shiojiri-shi, Nagano-ken (JP)

( * ) Notice: Subject to any disclaimer, the term of this patent is extended or adjusted under 35 U.S.C. 154(b) by 0 days.

(21) Appl. No.: 09/031,993

(22) Filed: Feb. 27, 1998

(51) Int. Cl.[7] .................................................. H04L 12/50
(52) U.S. Cl. ........................ 370/358; 370/493; 370/468
(58) Field of Search .................................. 370/359, 352, 370/354, 460, 463, 468, 465, 522, 358, 493, 389

(56) References Cited

U.S. PATENT DOCUMENTS

| | | | |
|---|---|---|---|
| 4,763,321 | 8/1988 | Calvignac et al. | 370/94 |
| 4,802,164 | 1/1989 | Fukuoka et al. | 371/16 |
| 4,965,798 | 10/1990 | Mostafa et al. | 370/79 |
| 4,974,224 | 11/1990 | Boone | 370/94.1 |
| 4,979,118 | 12/1990 | Kheradpir | 364/436 |
| 4,991,204 | 2/1991 | Yamamoto et al. | 379/221 |
| 4,999,833 | 3/1991 | Lee | 370/94.1 |
| 5,045,994 | 9/1991 | Belfer et al. | 364/200 |
| 5,115,309 | 5/1992 | Hang | 358/133 |
| 5,166,927 | 11/1992 | Iida et al. | 370/60 |
| 5,245,638 | 9/1993 | Gustafson | 395/575 |
| 5,303,166 | 4/1994 | Amalfitano et al. | 364/551.01 |
| 5,377,262 | 12/1994 | Bales et al. | 379/220 |
| 5,392,223 | 2/1995 | Caci | 364/514 |
| 5,400,328 | 3/1995 | Burren et al. | 370/79 |
| 5,430,729 | 7/1995 | Rahnema | 270/94.1 |
| 5,499,240 | 3/1996 | Gittins et al. | 370/68.1 |

(List continued on next page.)

FOREIGN PATENT DOCUMENTS

| 97/06494 | 2/1997 | (WO) | G06F/17/00 |
|---|---|---|---|

OTHER PUBLICATIONS

K. Sklower, B. Lloyd, G. McGregor, D. Carr, T. Coradetti, "The PPP Multilink Protocol (MP)", Network Working Group, Aug. 1996.

C. Richards, K. Smith, "The PPP Bandwidth Allication Protocol (BAP)"; "The PPP Bandwidth Allocation Control Protocol (BACP)", Network Working Group, Mar. 1997.

A. Kuzma, "Always On/Dynamic ISDN Network Architecture" Dec. 1996.

A. Kuzma, "Always On/Dynamic ISDN", Oct. 1997.

"Managing UDP Traffic", TCP/IP Bandwidth Management Series, vol. 1, No. 3, The Packeteer Technical Forum.

"Shaping Traffic Behavior", TCP/IP Bandwidth Management Series, vol. 1, No. 2, The Packeteer Technical Forum.

"Controlling TCP/IP Bandwidth", TCP/IP Bandwidth Management Series, vol. 1, No. 1, The Packeteer Technical Forum.

(List continued on next page.)

Primary Examiner—Chi H. Pham
Assistant Examiner—Brenda H. Pham
(74) Attorney, Agent, or Firm—Sheridan Ross P.C.

(57) ABSTRACT

Allocation of telecommunication systems bandwidth is provided preferably in a predictive fashion. Packets are identified with particular data streams and characteristics of the data streams are used to predict probable future bandwidth requirements. Such predictions are used to allocate high-bandwidth channels, such as ISDN B channels and to close or switch channels as in accordance with predicted needs. Preferably the system is self-learning and can modify a rules base for making allocation decisions e.g. based on actual use statistics.

6 Claims, 17 Drawing Sheets

U.S. PATENT DOCUMENTS

| | | | |
|---|---|---|---|
| 5,526,350 | 6/1996 | Gittins et al. | 370/58.1 |
| 5,557,320 | 9/1996 | Krebs | 348/12 |
| 5,617,145 | 4/1997 | Huang et al. | 348/423 |
| 5,629,736 | 5/1997 | Haskell et al. | 348/387 |
| 5,638,363 * | 6/1997 | Gittins et al. | 370/358 |
| 5,654,969 * | 8/1997 | Wilhelmsson | 370/460 |
| 5,673,253 | 9/1997 | Shaffer | 370/229 |
| 5,701,294 | 12/1997 | Ward et al. | 370/252 |
| 5,708,659 | 1/1998 | Rostoker et al. | 370/392 |
| 5,712,976 | 1/1998 | Falcon, Jr. et al. | 395/200.09 |
| 5,951,637 * | 9/1999 | Kuzma | 709/204 |

OTHER PUBLICATIONS

Vendor's ISDN Association, "Current Initiatives, Always On/Dynamic ISDN", Jan. 28, 1998.

Packetshaper™ 1000, Branch Office Bandwidth Management Brochure, Packetter.

* cited by examiner

| Main Status | _ □ ☒ |
|---|---|
| Tools Router Help | |

| Name | Last Update | | Status |
|---|---|---|---|
| Wirth | 5/11/97 | 9:45AM | Active |
| Pascal | 5/8/97 | 7:00PM | Unknown |
| Vonneuman | 5/10/97 | 3:23PM | Inactive |
| Turnkey | 5/11/97 | 1:00PM | Active |
| Router 1 | 5/11/97 | 11:11AM | Active |
| Router 2 | 5/10/97 | 1:13AM | Active |
| Router 3 | 5/9/97 | 4:00PM | Unknown |
| Router 4 | 5/11/97 | 5:21PM | Inactive |
| Router 5 | 5/10/97 | 3:09AM | Active |
| Router 6 | 5/11/97 | 4:00PM | Active |
| Router 7 | 5/11/97 | 3:11AM | Active |
| Router 8 | 5/11/97 | 4:01AM | Active |
| Router 9 | 5/10/97 | 7:26PM | Unknown |
| Router A | 5/11/97 | 4:00AM | Active |

Routers: 20    Active: 15    Inactive: 2    Unknown: 3

| Router <Tesla> | _ □ ☒ |
|---|---|
| Options | |

Statistics | Policies | Ports

Type of Statistics: [ ▽ ]

History

Detail for last 24 hours:

| Time | | Bytes | Packets |
|---|---|---|---|
| 6/4/97 | 10:00AM | 2,345,213 | 328 |
| 6/3/97 | 11:12AM | 12,876 | 87 |
| 6/2/97 | 6:00PM | 153,097 | 109 |
| 6/2/97 | 12:03AM | 4,019 | 42 |
| 6/1/97 | 4:00PM | 34,194 | 90 |

Refresh Now

—1114a   —1114b

[ OK ]   [ Cancel ]

Router Name: Tesla    Status: Active    Policy Name: Tesla.Cap

PREDICTIVE BANDWIDTH ALLOCATION METHOD AND APPARATUS

FIELD OF THE INVENTION

The present invention permits allocation of bandwidth, such as allocation of ISDN-bearer channels to be based on a prediction of the size or other characteristics of a data stream, preferably with consideration of the effect of allocation on telecommunication costs.

BACKGROUND OF THE INVENTION

In the early days of telecommunications, users had few service options available, under what has now become known as POTS (plain old telephone service), often being restricted to choosing the number of incoming lines, private or "party line" service and, for larger users, selection of a private branch exchange (PBX). In contrast, modern users can select among a variety of services, each having associated advantages, disadvantages and costs, including (in addition to POTS) ISDN (Integrated Services Digital Network) service, T1 service, cellular service and the like. Services such as ISDN and T1 which provide a potential for large-bandwidth telecommunications have become particularly important as telecommunications use has expanded beyond voice traffic to include telefacsimile (fax), digital (or audio-modulated digital) signals (used, e.g., for network or Internet communications), and the like. Communication of some types of information, such as video information, digital file transfers, still images, streaming audio and the like, create heavy (if often short-lived) bandwidth demands.

Nevertheless, high-bandwidth services such as ISDN have not widely supplanted older, less-suitable telecommunications options, primarily because of the costs associated with high-bandwidth services (which may include not only installation fees, but connection fees and tariffs). Part of the cost associated with ISDN and other high-bandwidth options arises from the fact that, in many such systems, a large-bandwidth channel is allocated to each subscriber who must therefore bear the cost of the entire bandwidth for extended periods even though the user may only be able to benefit from, or use, the large bandwidth intermittently and for relatively short periods (e.g. during times when relatively large files are being transferred). Accordingly, systems have been proposed which bear a rough (and imperfect) analogy to a "party line" in which a given bandwidth is allocated for use by multiple users, but at different times, as their needs dictate.

One proposed system is referred to as (AO/DI) (Always On/Dynamic ISDN). In an AO/DI system, the "D" channel is continuously available (Always On). The relatively low bandwidth D channel serves as the "home" channel for a user and one or more B channels are utilized for relatively large transmissions and are closed as they are no longer needed. Such a system permits costs to be shared among a plurality of users, and cost to an individual user is reduced in a number of fashions. A given user need not bear the cost of a large-bandwidth channel during times it is not being used or is not needed by that end-user. Because ISDN lines are shared, a reduced number of lines is necessary to supply a given group of users, leading to reduced line charges and usage of equipment.

Certain protocols have been proposed in connection with an AO/DI system, including a multi-link point-to-point protocol (MLPPP) which allows aggregation of multiple channels, and a bandwidth allocation control protocol (BACP) which runs "on top" of MLPPP and provides a vendor-independent standard for initiation and management of opening and closing channels. Descriptions of the proposed AO/DI, MLPPP and BACP can found, e.g., at "Always On/Dynamic ISDN," RFC-1990 and RFC 2125 respectively, available from the Vendors' ISDN Association (VIA) (a non-profit California corporation located at Bishop Ranch 2, 2694 Bishop Drive, Suite 105, San Ramon, Calif. 94583) or on the Internet at http://ftp.via-isdn.org/, and incorporated herein by reference. These three systems, however, while they provide the capability of switching or allocating bandwidth, do not dictate a system for determining or deciding when to make such allocations or deallocations, much less suggesting a decision-making system which would be effective and efficient.

One possible approach is a queue-depth system which allocates a large-bandwidth channel when the number of communication packets that have accumulated in a processing queue has reached a predetermined threshold. Such a system, in essence, is based on a consideration of past traffic volume only. If traffic which has already occurred has reached a predetermined volume in a given period of time, a wider-bandwidth channel is allocated. Although such a system will function at a certain level, it will not necessarily achieve the goals of lowering costs and providing for ease of use. Indeed, there are situations in which a queue-depth system would increase costs over those that would be incurred if no bandwidth switching or allocation took place. For example, if a threshold is reached just before the end of, e.g., a file transfer, a queue-depth system will nevertheless allocate additional bandwidth (and, typically, cause costs to be incurred for the end user) even though the end user will receive little or no benefit from the additional bandwidth, (since the file transfer will be complete before or shortly after such additional bandwidth is allocated). Because such thresholds would be predetermined and fixed, these problems cannot be solved by merely selecting a different threshold value. For example, although raising the threshold might have avoided unnecessary charges from a futile B channel allocation in the example above, transfers with other characteristics (e.g., frequent large but short data transfers) would receive no benefit from the system with a high threshold.

A queue-depth system, thus requires, for efficient use, that the threshold should be established so as to accommodate the particular mix of traffic for a given end-user. However, a typical end-user will have neither the skills nor the time to achieve an optimal or even useful threshold value. Thus, the queue-depth system, in addition to being unable to achieve cost savings goals in many situations, also imposes relatively heavy administrative costs in implementing the system. Furthermore, a queue-depth system is inflexible and cannot adjust to changes in the characteristics of the data traffic, (e.g. as traffic changes throughout the day or for a longer period of time.) For effectiveness, any adjustments to the threshold in a queue-depth system would require a significant expenditure of time by a relatively highly-skilled administrator. Additionally, a queue-depth system can not allocate bandwidth early in a given data stream (e.g. can not allocate bandwidth after only the first few—such as 1 to 4—packets) but must wait at least until enough packets have arrived to reach the predetermined queue threshold.

Accordingly, it would be useful to provide a system which can achieve bandwidth allocation so as to fulfill the goal of lowering costs for high bandwidth telecommunications without imposing burdensome time and skill requirements to set up and maintain such a system. It would also be advantageous to provide a system which can accommodate to time-varying traffic or usage patterns. It would further be useful to provide a system that is capable of deciding on bandwidth allocation early in a data stream, such as after only the first few packets have been received.

Some systems for providing wide-bandwidth access place substantial burdens on end users such as requiring end users to invest in significant additional hardware or software. Accordingly, it would be useful to provide a system which achieves cost effective and efficient provision of wide bandwidth capability for telecommunications without requiring significant installation of additional equipment or software at the end user location (client side) in order for such a system to operate.

Additionally, some systems impose significant burdens on telecommunications companies in order to implement efficient bandwidth allocation. For example, implementing a system which modifies or "resides" in a protocol stack would require a vendor to recertify the protocol stack, adding to the vendor's costs to implement such a system. Because telecommunications systems use equipment and software from a wide variety of vendors, bandwidth allocation procedures which depend on a certain level of interaction with vendor equipment or software will require different versions to operate, depending on which vendor supplies the basic routing or other telecommunications equipment and software (i.e., will be vendor-dependent) imposing costs which involve selecting the proper version required for operability and the development and implementation costs associated with providing multiple different versions of a bandwidth allocation system to operate in connection with multiple router vendor devices and software.

Accordingly, it would be useful to provide bandwidth allocation apparatus and procedures which reduce or minimize costs to telecommunications companies and developers, such as systems which reduce or avoid recertification costs and which are at least partially vendor-independent.

SUMMARY OF THE INVENTION

The present invention includes a recognition of at least some of the problems of previous procedures and apparatus, including as described above. The present invention involves making bandwidth allocation procedures decisions based at least partially on a predictive scheme, i.e. using characteristics other than (or in addition to) queue-depth to increase the likelihood that, on average, bandwidth allocations will achieve more efficient bandwidth utilization and, preferably, lower costs to users (at least on average).

According to one embodiment, data packets are identified as belonging to particular data streams. A characteristic of the data stream (e.g. its classification related to a type of data being transferred, such as GIF data, streaming video data, text E-mail or batch binary downloads) enters into a decision regarding whether it is likely to be efficient and/or cost-effective to allocate additional bandwidth for use in transmitting future packets in this stream. For example, in one embodiment, receipt of the first few packets of a GIF stream may result in allocating additional bandwidth (if, e.g., the system predicts that a relatively large amount of GIF data will be forthcoming during the remainder of the data stream) whereas receipt of the same amount of data classified as a text E-mail (i.e. which has achieved the same queue-depth as the above-described GIF stream) may not be allocated additional bandwidth if the system predicts that the text stream will be relatively short-lived or unnoticed, e.g. if not received immediately.

In one embodiment, the system can access various components or fields of data packets to associate a packet with a particular stream (such as source/destination/port information, or, in some cases, data field information). Preferably the system can use various procedures for classifying a particular data stream as to the type of data.

In some implementations, in addition to (or in place of) using classifications of data streams as to type of data, other information useful in predicting future bandwidth requirements for a data stream are employed (such as knowledge, for a given user, that a particular type of data stream occurring during a certain time period is likely to be relatively long or relatively short). The present system is preferably a heuristics-bases system and, in one embodiment, such additional predictive information is developed and used by a self-learning or artificial intelligence system. In this way, the system may accommodate itself to changes over time in a fashion that is automatic. In this context, "automatic" means that the goals are achieved by a computer or computer system without a requirement for analysis, decisions or other inputs from human operators or administrators (although, if desired, the system can be configured to permit human input to supplement or override the automatic analysis). Providing at least certain portions of the invention as byte code systems is believed to assist in more easily modifying rules (as described below), e.g. to more easily achieve self-modification or self-learning.

Preferably the system is substantially modularized. In one embodiment, the module which directly monitors or is coupled to the telecommunications line is configured so that it contains only, or substantially only, those items which must be performed in real-time and is preferably configured to operate rapidly, such as by operating as a byte code system, preferably an efficient or optimized byte code system. Other components of the system, such as those configured to analyze system operation (e.g. after-the-fact) and/or provide learning or other artificial intelligence capabilities, (and which typically do not operate in real-time) preferably are configured to reduce or minimize the load on routing computers, such as by operating substantially in a cycle-stealing mode (to employ routing computer facilities only during times when the routing computer would otherwise be idle).

In one embodiment, the system is substantially vendor-independent preferably by employing vendor APIs. Vendor-independence is preferably assisted by code modularization and by restricting vendor-dependent components, e.g. to several well-defined functions.

BRIEF DESCRIPTION OF THE DRAWINGS

FIG. 10 illustrates a display of network router information in connection with an embodiment of the present invention;

FIG. 11 illustrates a display of router statistics usable in connection with an embodiment of the present invention;

DETAILED DESCRIPTION OF THE PREFERRED EMBODIMENT

Figure 1:
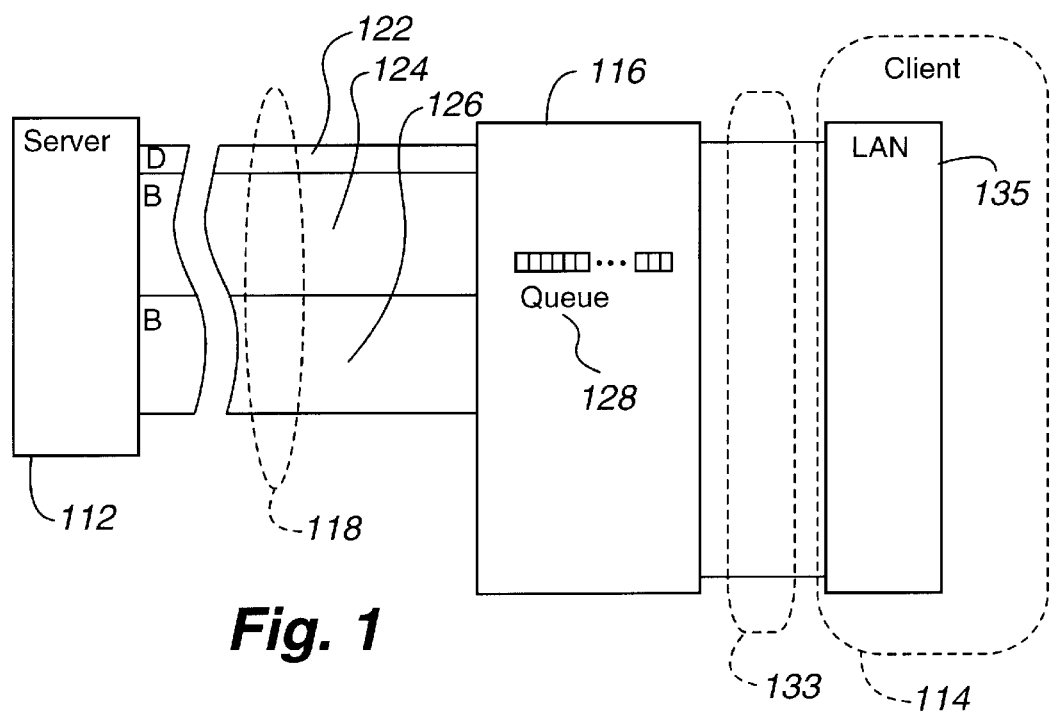
FIG. 1 is a block diagram of a telecommunications system useful in connection with an AODI networking application.

Before describing features of the present invention, it is believed useful to describe certain features of an AODI networking application and an example of a queue-depth control. In the system depicted in FIG. 1, a data server 112 (which may include one or many computers) and client 114 are coupled, to a router 116, with one side of the router 116, in the illustrated configuration, being coupled to the server side using an ISDN communications link 118. In a typical situation, the router 116 is coupled to a client that may involve a high bandwidth connection 133 to a Local Area Network (LAN) 135. The illustrated ISDN link includes a D channel 122 and first and second B (bearer) channels 124, 126. The D channel 122 has a relatively narrow bandwidth e.g. for accommodating data rates of up to about 9.6 kilobytes per second (KBPS). Each B channel 124, 126 has a relatively wide bandwidth, capable of accommodating 64 KBPS (for a total of 128 KBPS when both B channels are in use). As noted above, in an AODI system, the B channels are circuit-switched (e.g. according to BACP and MLPPP protocols).

In one implementation of AO/DI, the D channel 122 is always on (always off-hook). In one implementation of AO/DI, calls are initially placed and handled over the D channel, using packetized procedures such as those known as X.25 (which is described, e.g., in RFC-0874). Because the D channel is always-on, it is possible to provide always-available service, including, e.g., "push-mail".

When it is determined that additional bandwidth should be provided, one or both of the bearer channels are switched to assist in transferring the data. Typically the bearer channels will use MLPPP (e.g. without the X.25 packetization used on the D channel). When it is determined that such additional bandwidth should be discontinued, one or both of the B channels should be disconnected.

Figure 2:
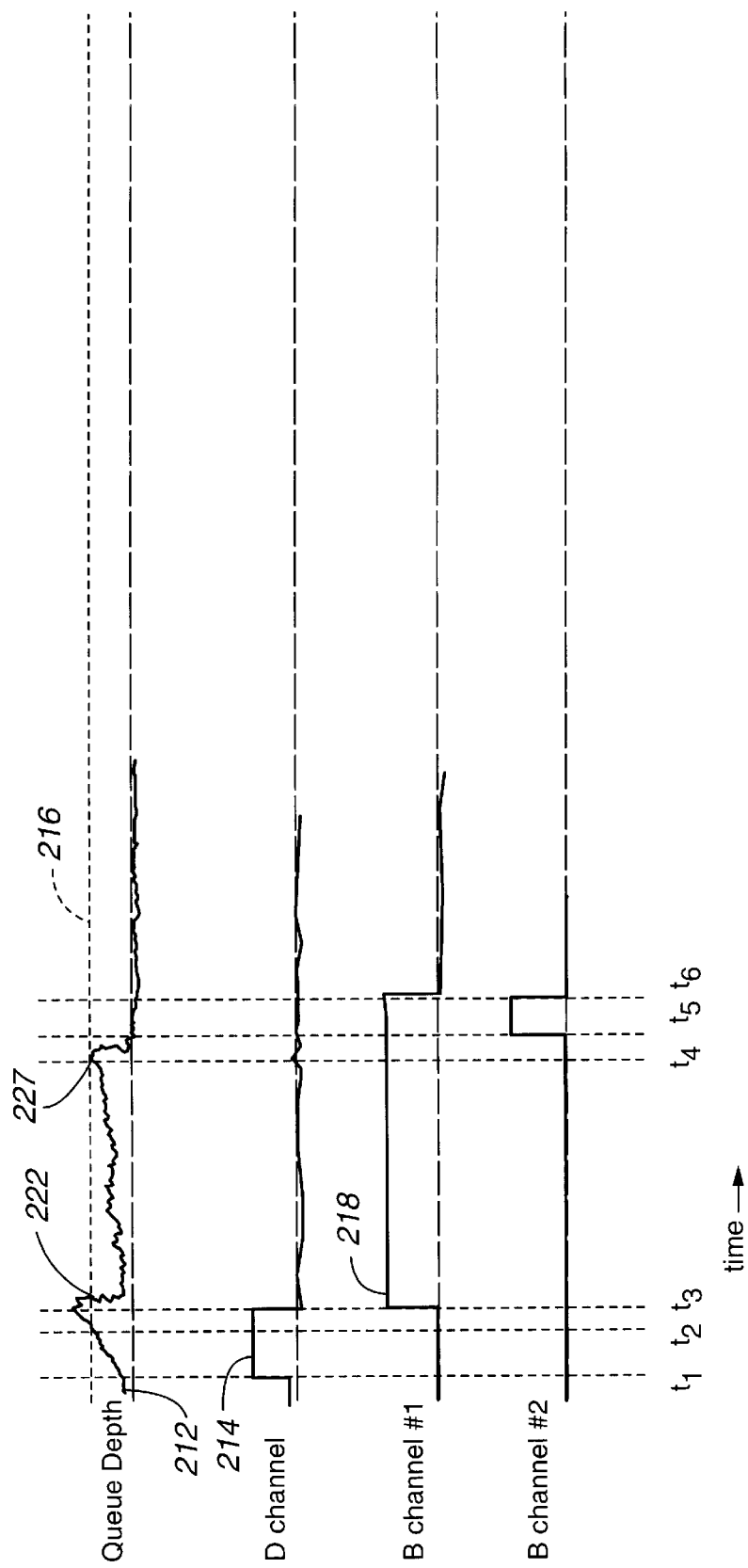
FIG. 2 is a timing diagram depicting an example of channel use allocated by queue depth.

The usefulness of AO/DI will be related to the manner in which bandwidth is allocated, i.e. the manner in which decisions to add or drop B channels are made. It is possible to base decisions on recent volume of data traffic, such as by basing the decision on whether the depth of data in a router queue 128 has reached a predetermined threshold. FIG. 2 presents a (simplified) example of queue-depth decision-making, and also illustrates one of the shortcomings of such a system. In FIG. 2, the queue depth 212 is initially low but begins rising relatively rapidly when data communication commences at time T1. As noted above, the communication will initially be carried by the D channel 214. However, because the D channel is relatively low-bandwidth, the queue-depth rapidly rises after T1, reaching a pre-defined queue-depth threshold 216 at time T2. The event of reaching the threshold 216 at time T2 triggers a decision to switch-in B channel number 1. Implementation of this decision takes a certain amount of time and thus, in the illustration of FIG. 2, the B channel number 1 is switched-in at time T3 218. Because the bandwidth of the B channel is relatively large, the queue depth rapidly falls 222 to a level below the threshold 216. In the example of FIG. 2, the data being transferred has a relatively large bandwidth requirement and, after a time T3, the queue depth continues to rise, although more slowly than during the period following time T1. In the illustrated example, the queue depth once again reaches the threshold 216 at time T4 224 triggering a decision to add the second B channel. In the illustrated example, however, it happens that the data transfer is complete shortly after the time T4. Nevertheless, because of the delay involved in switching in a B channel and, subsequently, the delay involved in discontinuing or switching out a B channel, B channel number 2, in the illustrated example, is switched in at time T5 and is not switched out until time T6. Thus, in the example of FIG. 2, the user will be charged for use of B channel number 2 between time T5 and T6, even though the user received no benefit from use of B channel number 2 (since data transfer was completed before the B channel was switched in).

Figure 3:
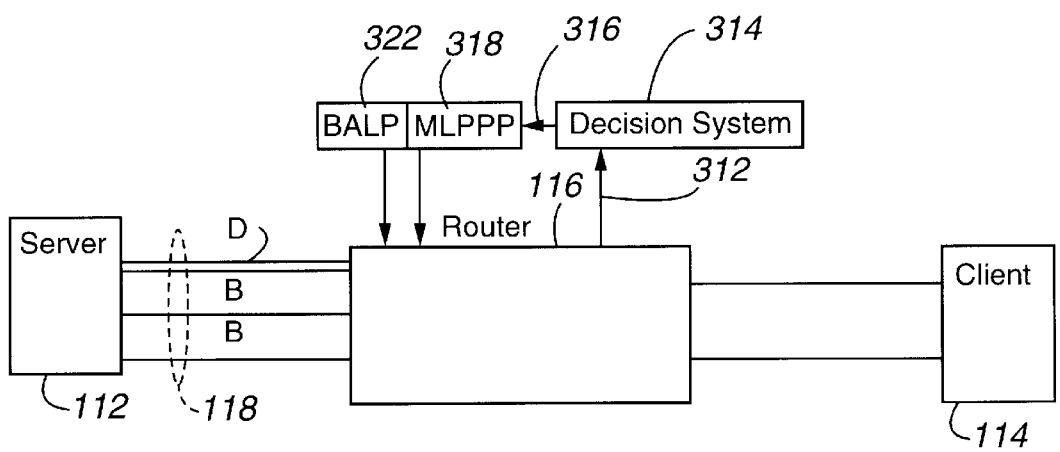
FIG. 3 is a block diagram depicting the flow of information useful for bandwidth allocation according to an embodiment of the present invention.

FIG. 3 depicts, in block form, a system which, according to the present invention, can base bandwidth allocation decisions on information other than (or in addition to) queue depth. Details of the system will be described below. In general, as shown in FIG. 3, information related to characteristics of the data is passed 312 to a decision system 314. The decision system determines whether and when bandwidth should be allocated or deallocated and these decisions are executed 316 using MLPPP 318 and BACP 322 to implement such switching in a manner to avoid disrupting data flow while achieving the desired bandwidth allocation. In the embodiment detailed below, the decision system 314 uses a rules base for making decisions and, preferably, provides a development environment for building the rules base. In one embodiment, the decision system 314 provides self-learning capability (artificial intelligence) e.g. so that it can modify its own rules base to meet changing environmental demands. The rules base architecture is preferably vendor-independent and preferably contains a management tool which is identical across various vendors' hardware systems, e.g. permitting administrators to manage varied systems from a single console at the same time.

The decision system 314 includes a number of components which, in one embodiment, are distributed. Some components reside on vendor's equipment while others reside on system developers' and/or administrators' work stations.

The system preferably operates on a stream-based rather than packet-based level. As is known to those of skill in the art, X.25, multi-link protocol and similar systems transfer a given data stream by transferring a plurality of data packets, each of which contains a portion of the data stream. The present system, rather than attempting to make separate decisions for each data packet, identifies the data streams which the packets make-up and makes decisions based on information regarding each different data stream. The decision system 314 can determine any or all of the size, start time, end time of a data stream e.g. through an ISDN interface. Preferably, the system can make this determination after obtaining information from only the first few packets of a data stream, and in some cases after obtaining information from only one (such as the first) packet of a stream (which may contain sufficient header or other information to identify the data type of the stream).

In addition, the decision system 314 can identify other characteristics of a stream. In an ISP (Internet Service Provider) environment, for example, the decision system 314 can determine if a particular stream represents an FTP (File Transfer Protocol) session, an HTTP (Hypertext Transfer Protocol) request to a server, or some other type of transmission. This information about stream-type can be used in making decisions about predicted needs on the underlying ISDN lines and thus serve as a basis for deciding, e.g., when to add channels and/or when to close channels. Table I provides for purposes of illustration, a list of selected data stream types and certain characteristics of the data streams which, in a given environment, may be useful in predicting future bandwidth needs for that data stream.

Other data types and characteristics are well known to those of skill in the art, including, for example, HTTP (hypertext transfer protocol), SMTP, SNMP and H.323.

TABLE I

| Data Stream Type | Typical Characteristics |
| --- | --- |
| FTP | Large size, large standard deviation in size, typically not time critical. |
| HTTP | Requests are small average size; Responses are large average size and large standard deviation in size, relatively time critical. |
| SMTP (E-mail) | Small average size, not time critical. |
| Video Conference/ Audio streams | Large average size, time critical. |

In one embodiment, predictions regarding future bandwidth needs for a data stream are implemented by a rules base. The rules base preferably can be modified, either automatically or manually, e.g. based on traffic statistics. Preferably, the decision system 314 automatically collects statistics useable for modifying the rules base. Although it is possible to implement a decisions system 314 according to the present invention in a number of fashions, implementation by a rules base configuration is believed to allow system developers to more readily program the decision system 314 to deal with different data streams and, preferably, in a relatively intuitive fashion such as via a series of yes/no decisions (with certain decisions providing the conditions for other decisions). Preferably such system design or programing is independent of the underlying hardware and thus can be used with any of the variety of hardware configurations. In one embodiment, reprogramming or modifications of the rules can be accomplished without interrupting operation of the system, e.g. without the need to re-boot the router 116.

Preferably, to assist in achieving efficient execution of the decision system 314, at least portions of the decision system 314 are executed as byte code. Preferably, the rules base system is compiled into vendor-independent byte code before being downloaded to vendor equipment. Preferably the byte code is specifically developed for operating on packets and for making binary (yes/no) decisions. Additional efficiency is preferably implemented by automatically ordering the binary decisions for optimum or increased efficiency. In one implementation, some or all binary decisions, as they are made, result in setting up flags for that session, so that decisions, once made, do not have to be repeated unless necessary.

Preferably, the byte code can be provided without the need for compiling (such as when an interpreter, rather than a compiler, provides the byte code). This approach can be useful in providing new or modified byte code which can be loaded on the real time component without the need to interrupt or re-boot the system or components thereof.

Figure 4:
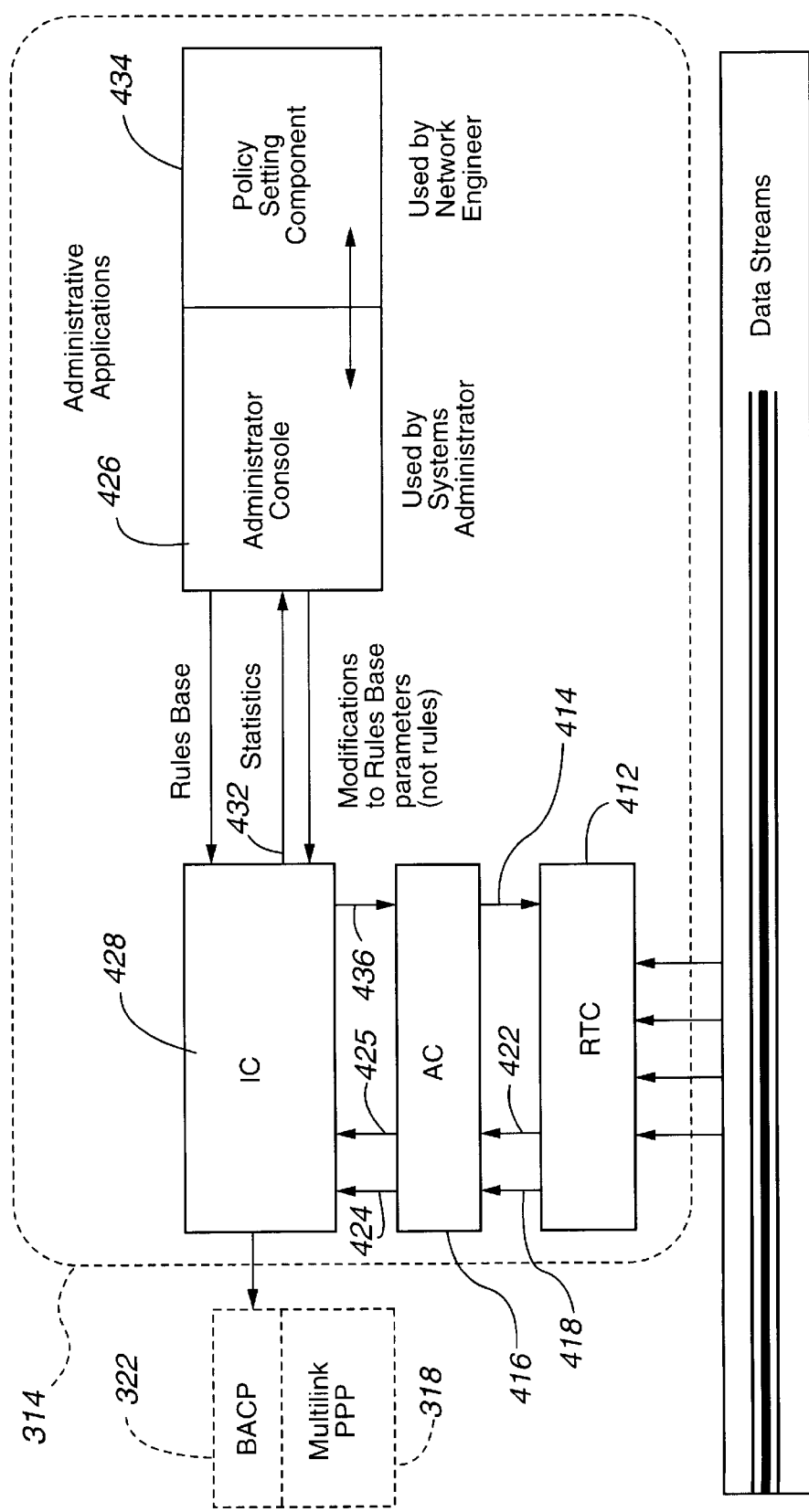
FIG. 4 is a block diagram depicting a modular implementation of an embodiment of the present invention.

Efficiency of execution is further promoted by the componitized or modularized structure of the decision system 314, such as the embodiment depicted in FIG. 4. In the embodiment of FIG. 4, a real time component RTC 412 interfaces to the ISDN 119 data streams (preferably to a router vendors' protocol stack) to obtain information regarding packets as they pass through the router 116. Preferably the RTC 412 does not reside in such stack but, instead, obtains information regarding packets through vendor application programming interfaces (API's). Since the protocol stack itself is not modified, there is no need to recertify a protocol stack when the present system is implemented, provided the vendor provides the necessary API's.

Preferably, the RTC 412 includes substantially all of the real time operations of the decision system 314. In the depicted embodiment, the RTC 412 performs a number of functions. It is capable of identifying start, middle and end packets of particular data streams. The RTC 412 makes decisions on when to switch channels, open channels and close channels using rules provided in a byte-code system or engine. The RTC 412 further collects statistics about data traffic. The type of statistics which are collected are determined, preferably, by the byte code engine.

In the embodiment of FIG. 4, the byte code engine which is executed by the RTC is provided to the RTC 414 by an adaptation component (AC) 416. This architecture permits modifying or updating the byte code engine executed by RTC. In particular, the AC 416 receives statistics on data stream characteristics as well as the channel switch/open/close decisions made by RTC 422. By comparing the received statistics against the existing rules base which the RTC is currently using, the AC 416 can determine if the rules base might be better adapted to the current environment. Preferably the AC 416 can automatically (without human intervention) generate a revised or modified version of a byte code engine and download the improved or adapted engine 414 to the RTC 412. In this way, the AC 416 modifies or adapts the RTC to meet specific needs of a changing environment. The statistics used by the AC are also preferably passed on to an administrator counsel 424 (in the depicted embodiment, via an Implementation Component (IC) 428.

Preferably the AC 416 need not operate in real time (or put another way, a slowdown or stoppage of the AC 416 will not have an immediate effect on current data flow). Modularizing or compartmentalizing those components, such as AC 416, which need not run in real time provides the opportunity to avoid placing excessive computational loads on the router computer since non-real time components such as the AC 416 can be configured to operate only as router processor cycles are available (i.e. to use the router processor during times when the router processor would otherwise be idle). Use of cycle-stealing permits relatively complex and time-consumptive analysis to be accomplished without affecting overall performance and without the need for significant (or, in many cases, for any) addition or upgrading of routing processors or other hardware. Cycle-stealing and other efficiency-enhancing measures as described herein make it feasible to employ the learning or artificial intelligence approaches described herein which, it is believed, were previously generally considered infeasible for telecommunications routers because of the computational load involved. The AC 416 also passes-on the switch/open/close channel decisions (made by the RTC) 425 to the IC 428. A major function of the IC 428 is to implement the decisions made by the RTC by interfacing to vendors' implementations of BACP 322 and MLPPP 318. Preferably the IC 428 makes calls to BACP using vendors API's in order to switch channels, open channels and tear down channels, as decided by RTC and conveyed through the AC 416. IC 428 also stores statistical information 424 and passes it on 432 to the administrator counsel 426. As depicted in FIG. 10, the Administrator Console 426 preferably may be configured to display, e.g. information about all routers in a network, such as status 1012, numbers of total, active and inactive routers 1014 and the like. As depicted in FIG. 11, the Administrator Console 426 preferably may be configured to display, e.g. detailed customizable views of many types of statistics for various routers, such as status 1112, Bytes and Packets in various time periods 1114*a*, 1114*b* and the like.

New or modified rules bases can be developed by administrators using depicted administrative applications 426, 434. Such new rules bases are downloaded 436 by the IC 428 (e.g. via Internet Protocol (IP) Sockets) to the AC 416 where they are converted into (preferably optimized) byte code that the RTC 412 can use. Conversion into byte code, particularly efficient or optimized byte code, can be a difficult task. In one embodiment, the task is achieved or assisted using prime implicants theory-based procedures.

Figure 12:
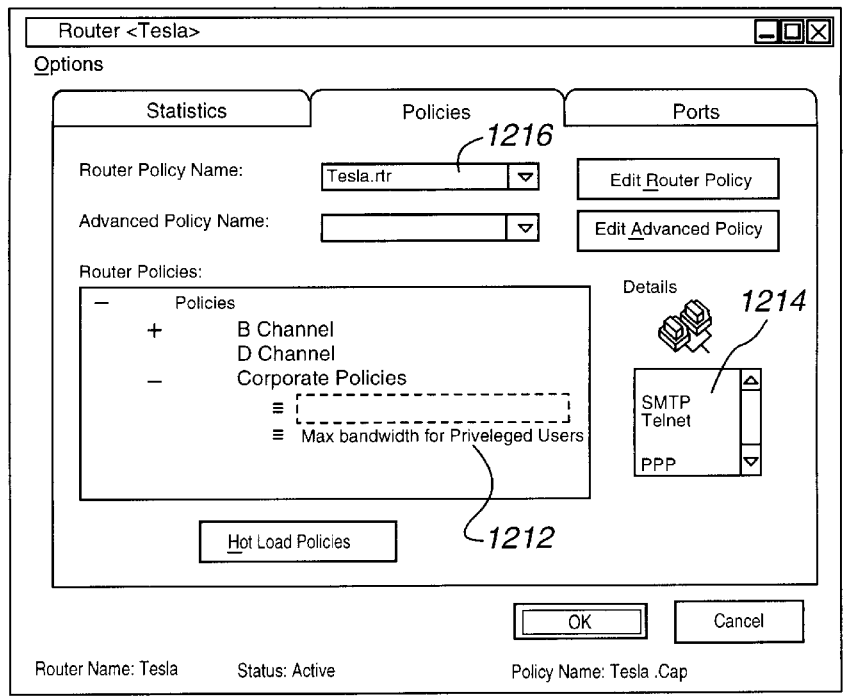
FIG. 12 depicts a display of policy options usable in connection with an embodiment of the present invention.
Figure 13:
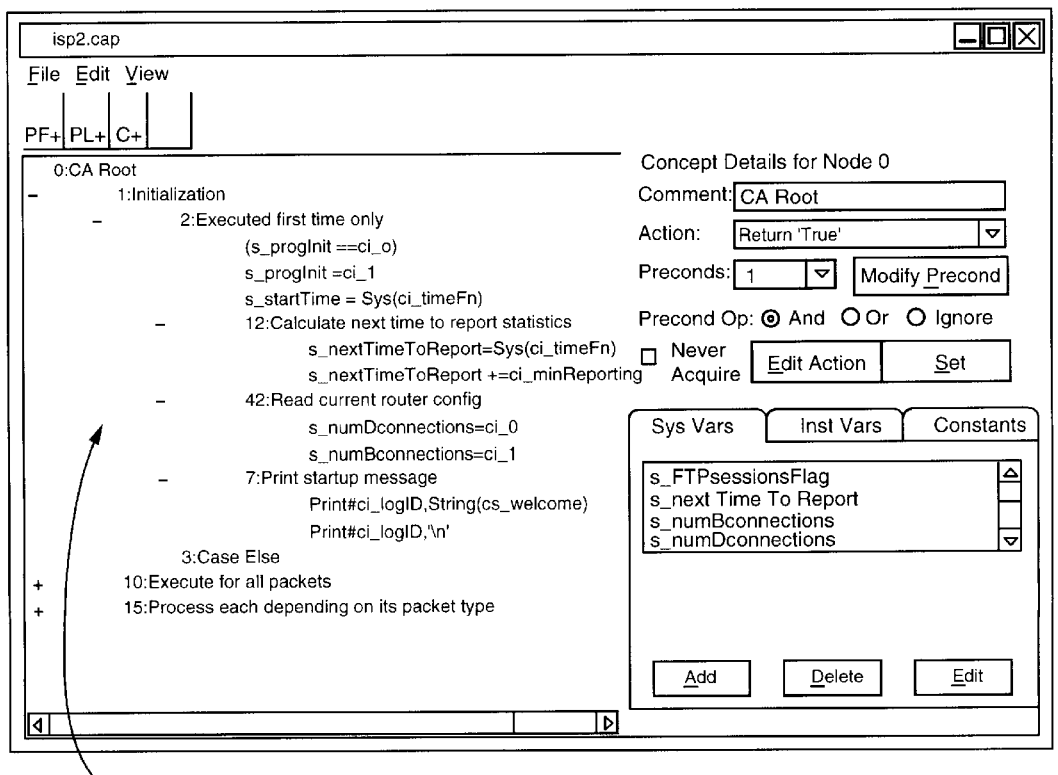
FIG. 13 depicts a display of a policy editor usable in connection an embodiment of the present invention.

Preferably the administrator console 426 provides a graphical user interface (GUI) to assist an administrator in setting or changing parameters for rules bases running on routers in a network (or specific portions of rules bases such as router policies or user policies). For example, in one embodiment, as depicted in FIG. 12, the administrator console 426 can be configured to facilitate selection of certain policies, such as by displaying drop-down boxes or other selection items, e.g. for setting maximum bandwidth for privileged users 1212, setting policies for certain data types 1214, naming policies 1216 and the like. Preferably the administrator console 426 also provides an easily accessible and understandable view of the statistics 432. In the depicted embodiment a Policy Setting Component 434 is used, e.g. by a network engineer, to create and modify rules bases. As depicted in FIG. 13, such policy setting is preferably facilitated by arranging in "tree" views 1312 of a type familiar to many programmers or network engineers.

Preferably the administrator console permits simultaneous management of one or more decision systems 314 and multiple rules bases from a single location. Use of an interface such as a sockets-level IP interface to all decision systems assists in accomplishing this task. In such a configuration, the interface presented on the administrator console, as well as the language used for creating and modifying rules bases, is vendor-independent, and thus will appear the same to an administrator regardless of the type of vendor hardware present on a given IP network.

Figure 5:
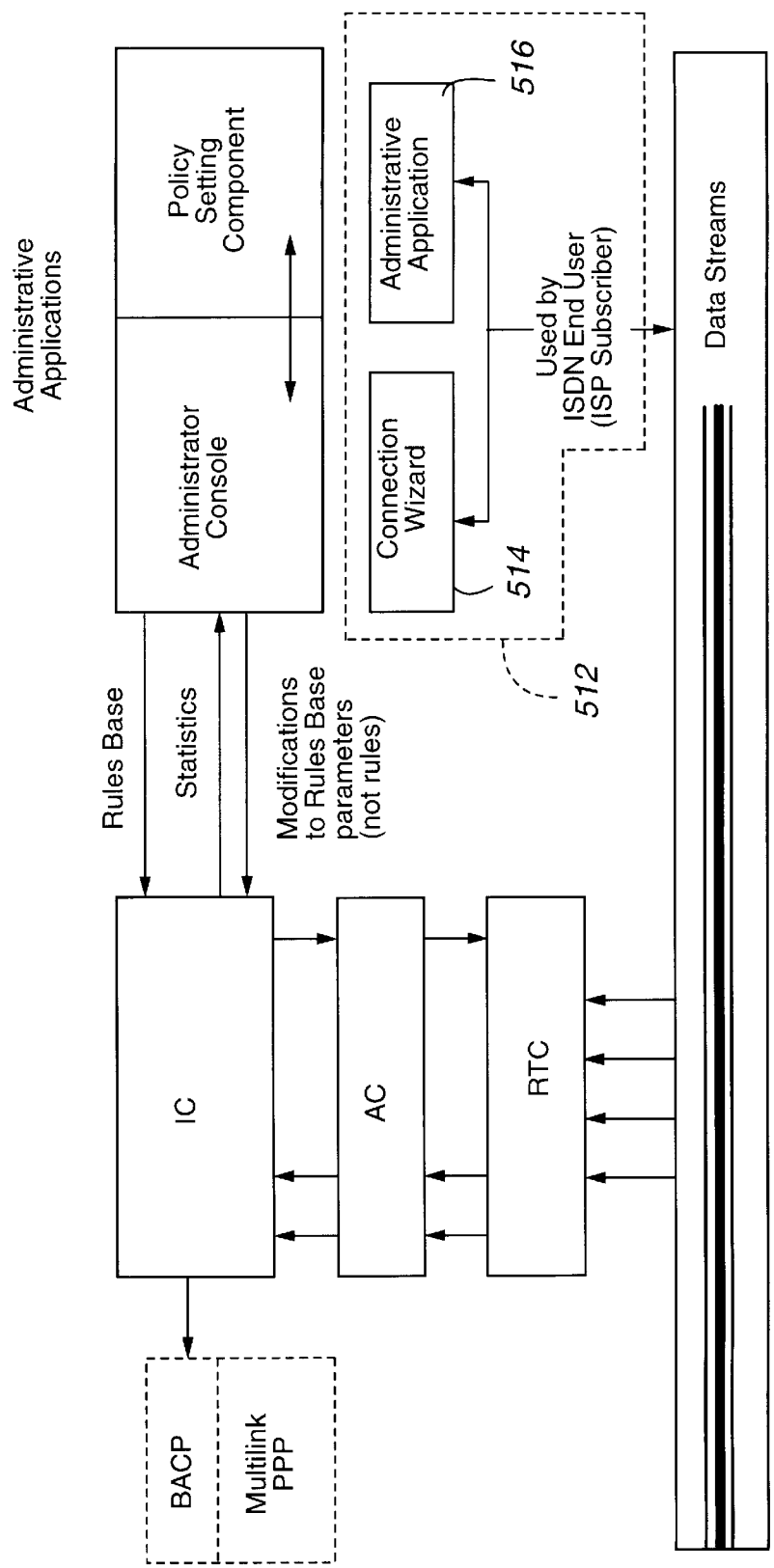
FIG. 5 is a block diagram similar to the diagram of FIG. 4 but depicting additional client side components.

As illustrated in FIG. 4, it is possible to implement the present invention in the absence of modification to hardware or software of an end user or client 114. However, it is also possible, and in some cases advantageous, to provide a system which includes certain client-side applications e.g. as depicted in FIG. 5. In one embodiment, a client connection component 514 assists in setting up a users' ISDN connection to both a telephone company and the ISP (Internet Service Provider). An administration component 516 can be provided to offer an end user a degree of control over his or her own ISDN usage (e.g. through use and modification of a user policy) which may then be integrated into the rules base running on the router to which the user is connecting. This may be used, e.g., to permit users to further increase efficiency and reduce costs of data transmission based on their special knowledge of their own requirements. A user may, for example, wish to indicate a particular balance between costs and level of service, or may wish to specify that, for example, e-mail messages are to receive top priority regardless of cost. The server side may also wish to have some potential for influence on operation of the system. In one embodiment, when an ISP wishes to change or add options available to an end user, the service provider can immediately "hot load" the modified options to the client side.

Figure 6A:
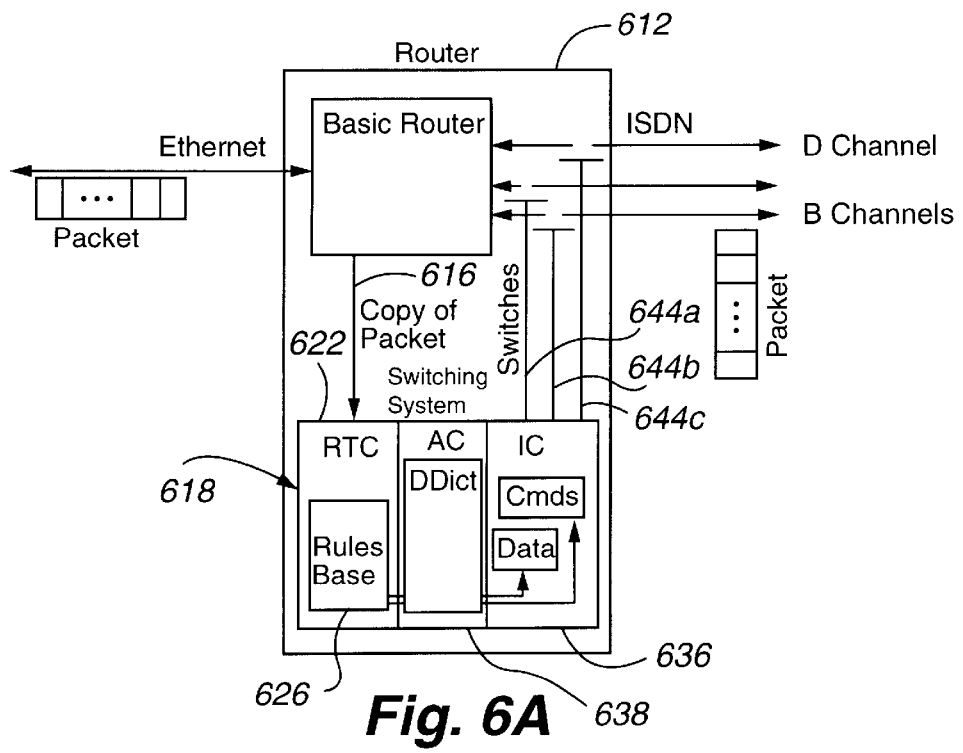
FIGS. 6A and 6B are a block diagram and a flow chart, respectively, illustrating procedures using the components of FIG. 4.
Figure 6B:
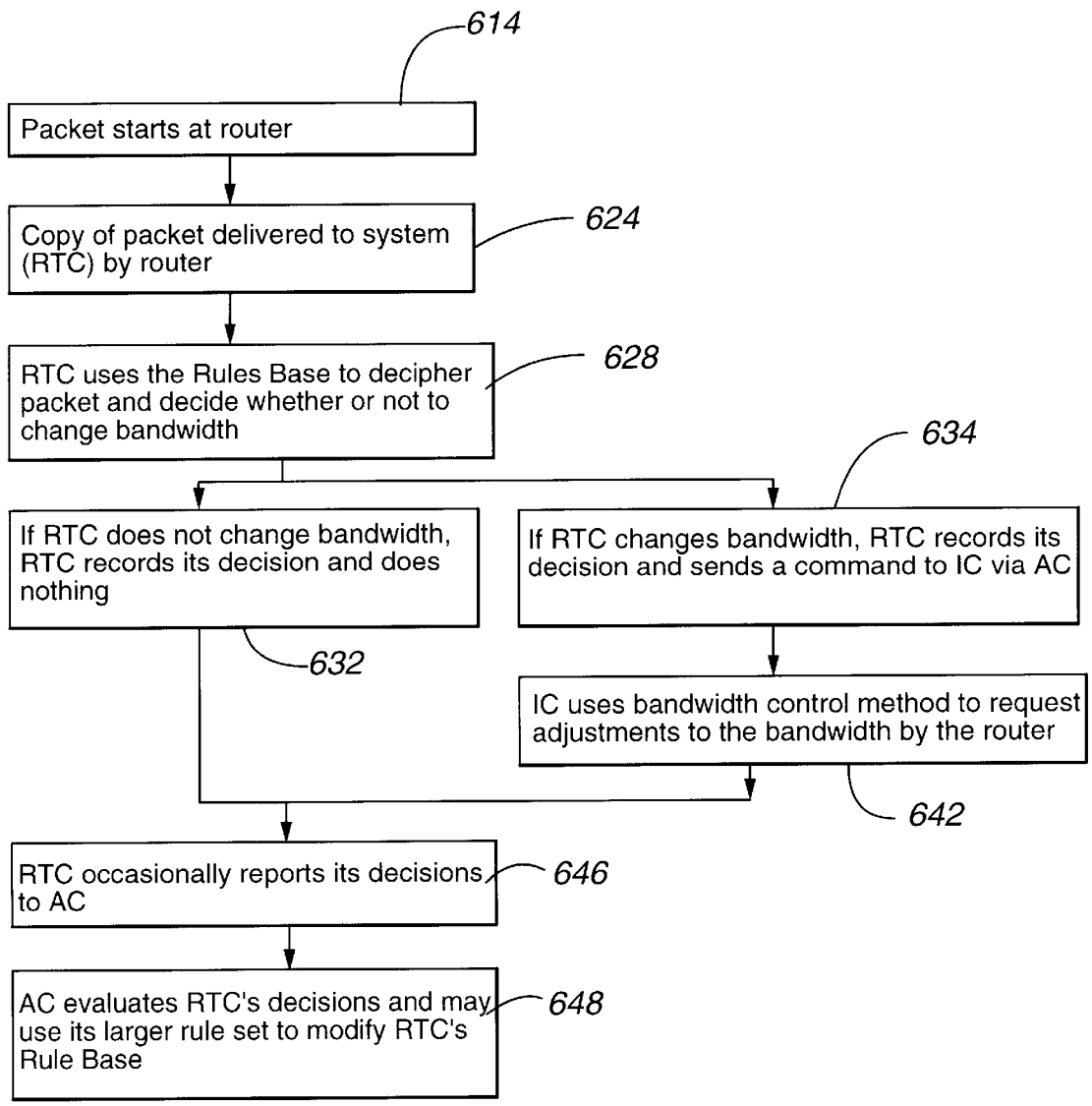

FIGS. 6*a* and 6*b* depict components and process steps involved in making channel switching decisions according to one embodiment of the present invention. In the depicted configuration, when a data packet reaches a router 612,614, a copy of the packet 616 is delivered to the switching system 618 and, in particular, to the RTC 622 by the router 624. The RTC uses the rules base 626 to decipher the packet and determine whether or not to change the bandwidth 628. If the RTC does not change the bandwidth, the RTC will record this decision and do nothing further with regard to the packet 632. If the RTC determines that bandwidth should be changed, the RTC will record its decision and will send a command 634 to the IC 636 via the AC 638. The IC 636 uses a bandwidth control method to request adjustments to the bandwidth by the router 642, essentially opening or closing bandwidth switches 644*a,b,c*. Regardless of whether a particular packet results in a change in bandwidth, the RTC 622 will occasionally or periodically report on the decisions it has made to the AC 646. The AC 638 will evaluate these decisions and may use its own larger rule set to modify the rules base 626 of the RTC 648.

Figure 7A:
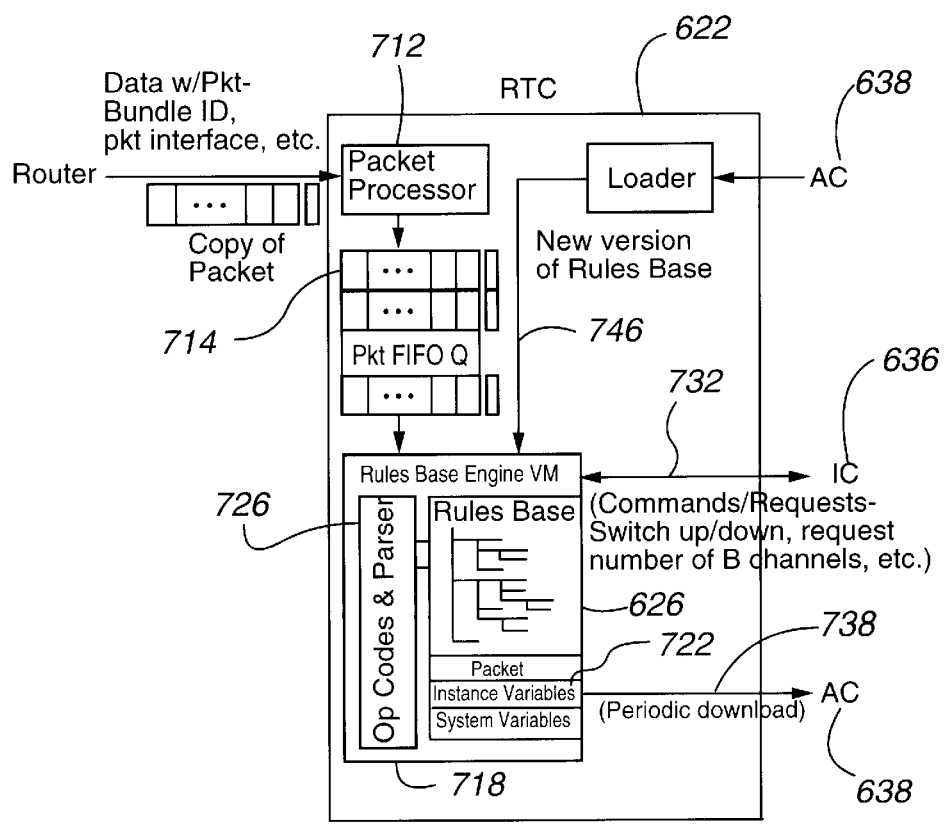
FIGS. 7A and 7B are a block diagram and a flow chart, respectively, illustrating procedures in connection with a real time component according to an embodiment of the present invention.
Figure 7B:
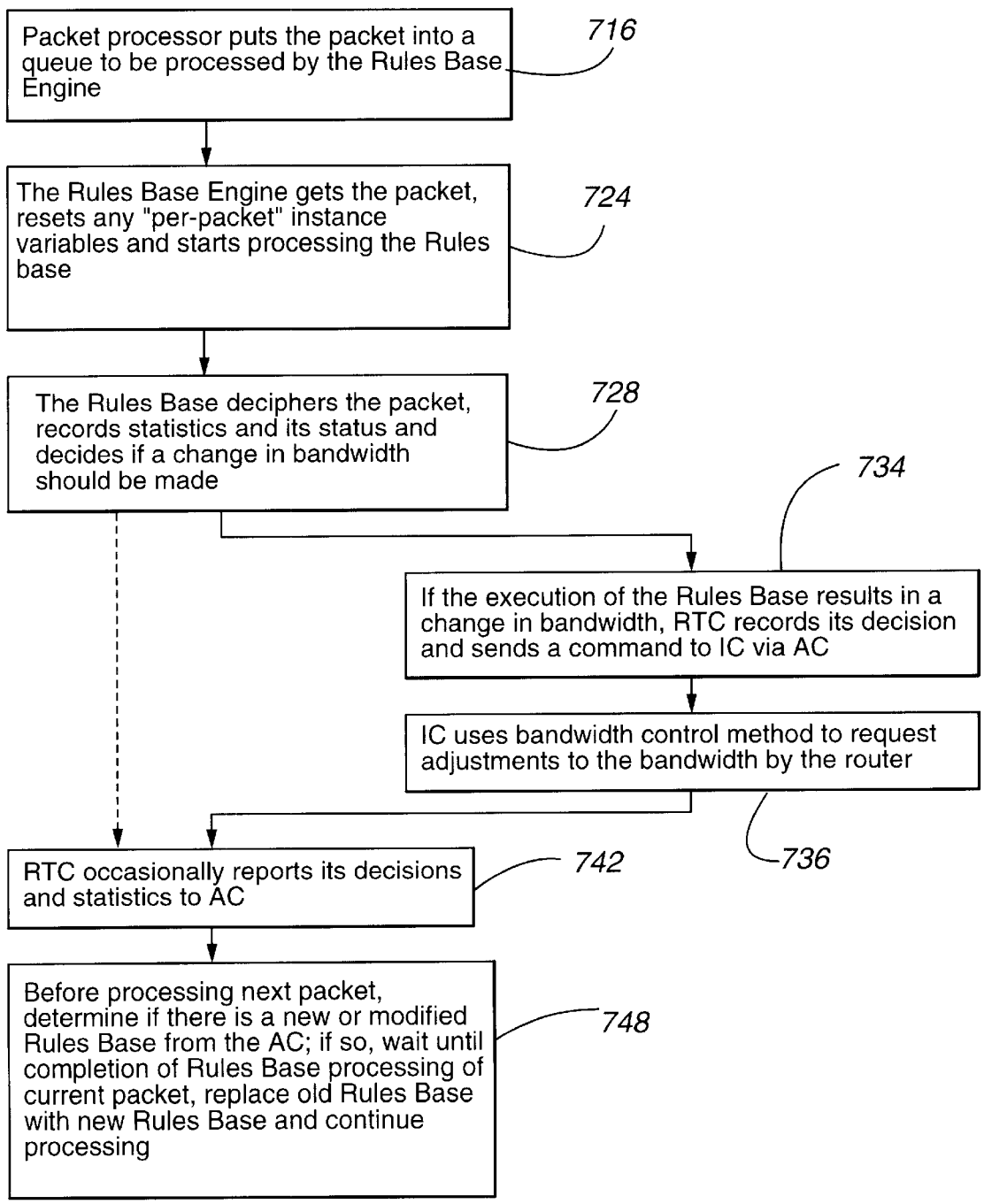

FIGS. 7*a* and 7*b* illustrate operation of the RTC in greater detail. A packet processor 712 places a newly-arrived packet copy into a packet queue such as a first in, first out (FIFO) queue 714 so that it can be processed by the rules base engine 716. The rules base engine 718, when it receives a packet from the queue 714 resets any "per packet" instance variables 722 and starts processing 724 via the rules base 626. The rules base 626 deciphers the packet, e.g. relying on an opcode list and/or parser 726, records statistics related to the packet and its status, and determines if a change in bandwidth should be made 728. If execution of the rules base results in a change in bandwidth, the RTC 622 records its decision, and sends a command 734 to the IC 636 (via the AC). As noted above, the IC 636 uses a bandwidth control method to request adjustments 736 to the bandwidth by the routers 612. The RTC 622 as noted, periodically or occasionally reports its decisions 738 and statistics to the AC 742. Before processing the next packet, the RTC will determine if there is a new or modified rules base received from the AC 638. If so, the RTC will wait (i.e. will not process new packets from the queue 714) until completion of processing (using the old rules base) of the current packet, will replace the old rules base with a new rules base 746 and continue processing 748.

Figure 8A:
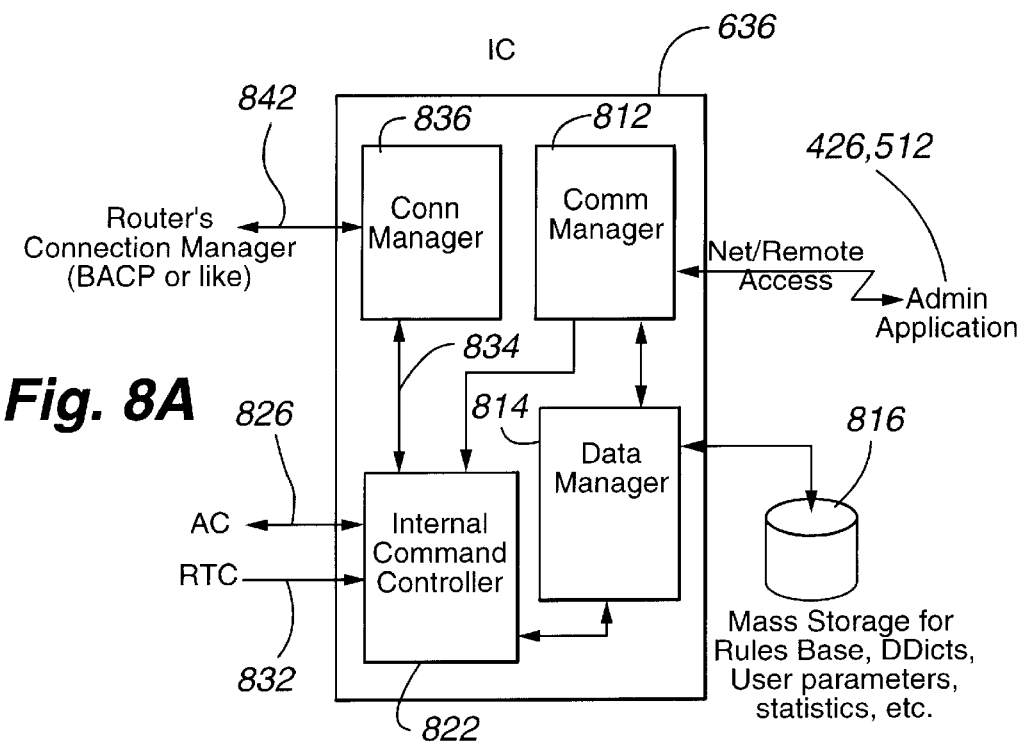
FIGS. 8A and 8B are a block diagram and a flow chart, respectively, depicting procedures in connection with an implementation component according to an embodiment of the present invention.
Figure 8B:
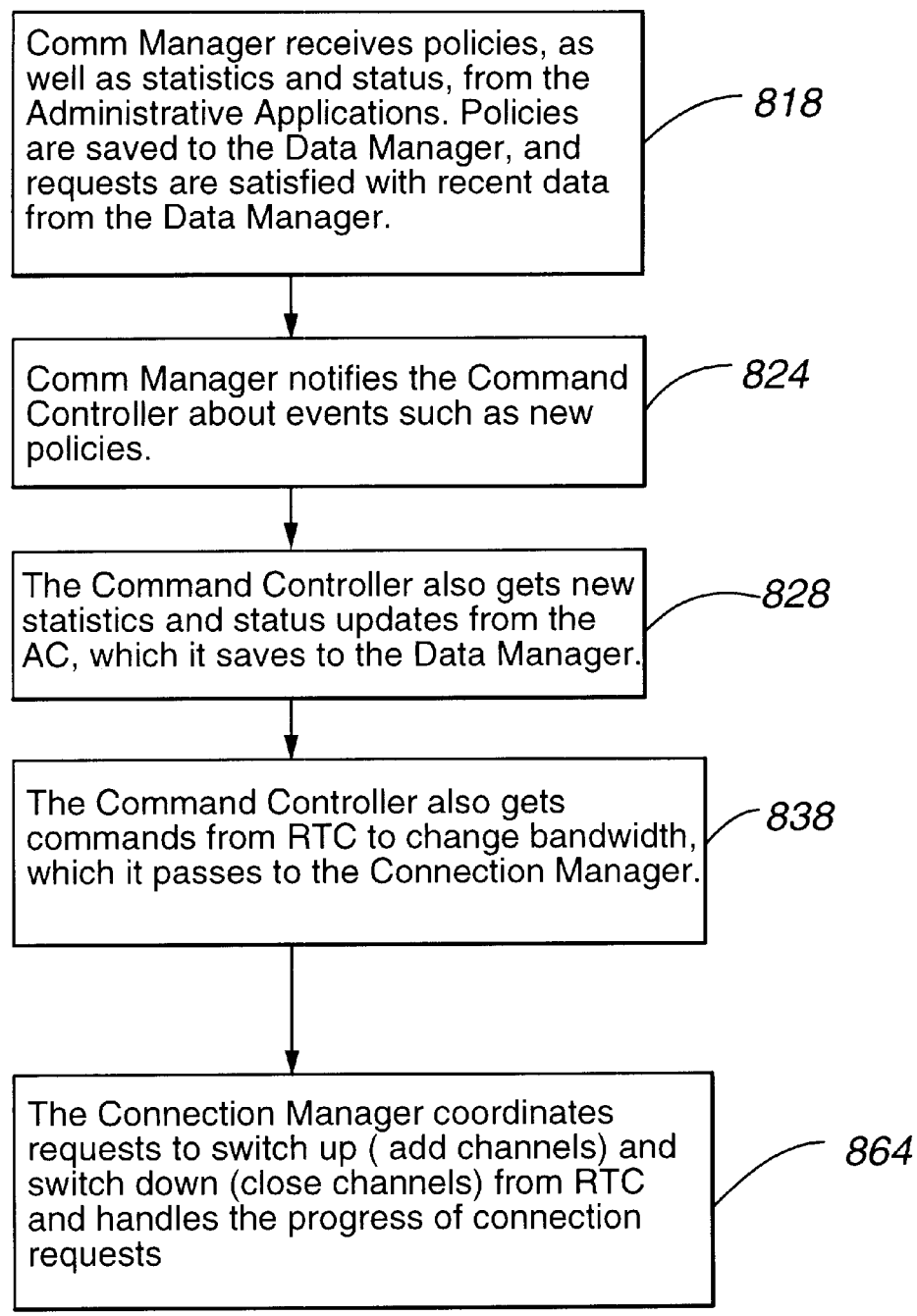

FIGS. 8a and 8b depict processing and components of an IC 636 according to an embodiment of the invention. In the depicted embodiment, a comm manager 812 can receive policies, statistics, and status information from administrative applications 426, 512 with policies being saved via a data manager 814 (e.g. on a mass storage device 816) and may request information, to be satisfied with recent data from the data manager. The mass storage device 816 may be used for storing rules bases, data dictionaries, user parameters, statistics, and the like. The comm manager 812 notifies an internal command controller 822 about events 824 such as new policies. The command controller 822 may also receive new statistics and status updates from the AC 826 which it may save to the data manager 828. The command controller 822 also receives commands from the RTC 832 such as commands to change bandwidth which it passes on 834 to a connection manager 836, 838. The connection manager 836 coordinates requests to switch up and switch down, e.g. by communicating 842 with a router's 612 connection manager (e.g. a BACP or the like), and handles the progress of connection requests 844.

Figure 9A:
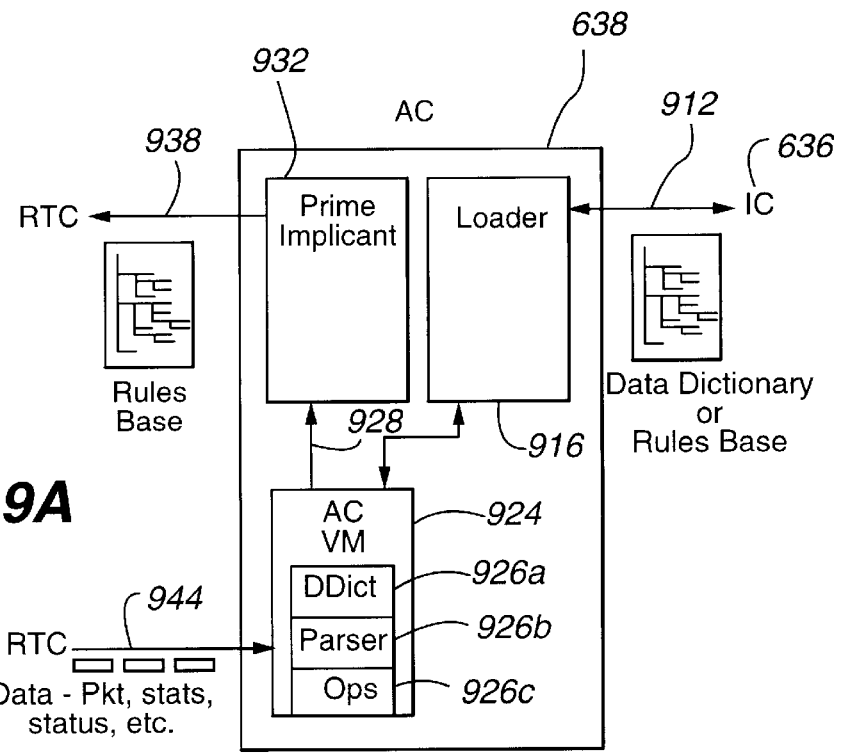
FIGS. 9A and 9B are a block diagram and a flow chart, respectively, depicting procedures in connection with an adaptation component according to an embodiment of the present invention.
Figure 9B:
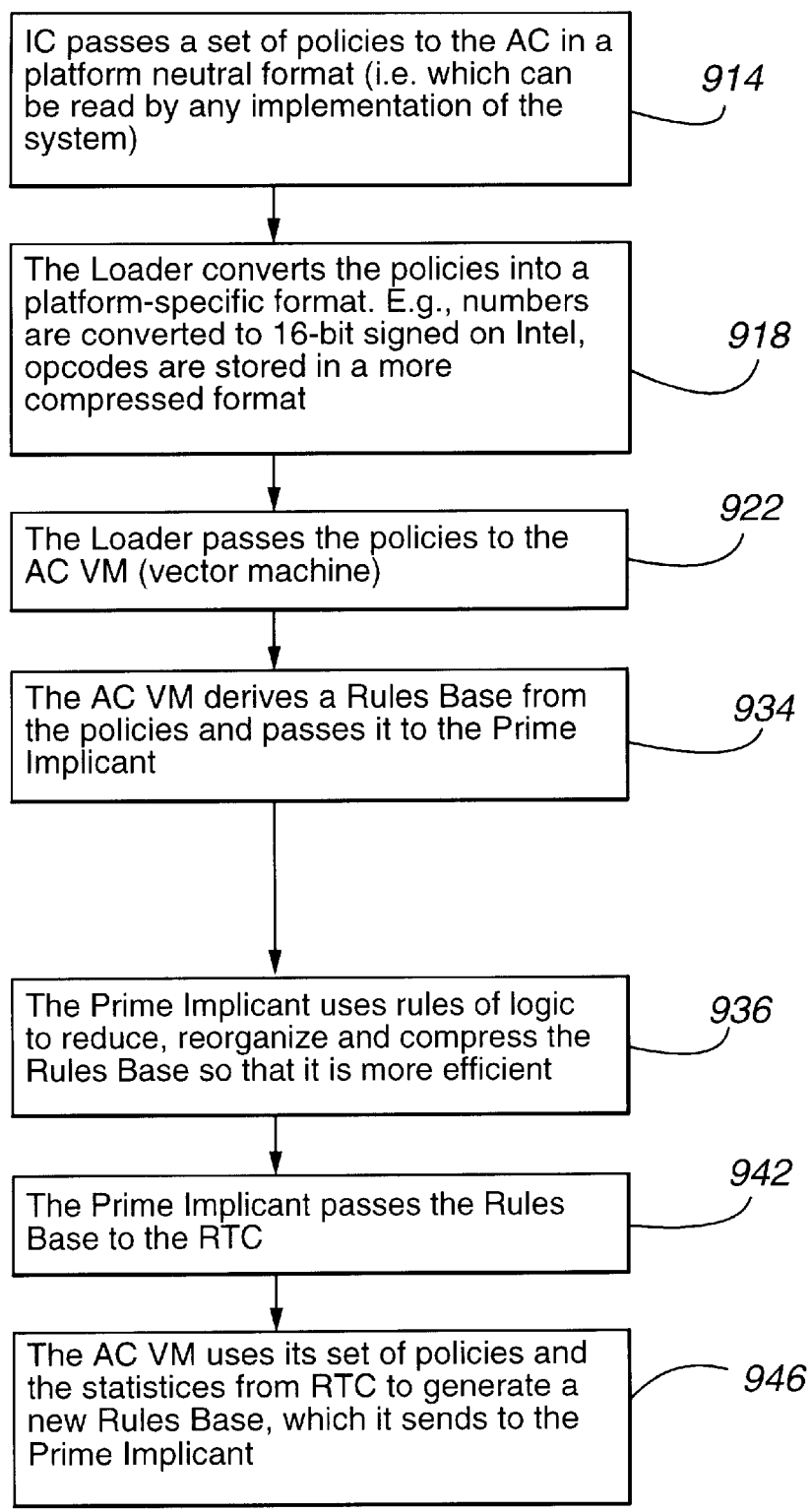

FIGS. 9a and 9b illustrate operation and components of an AC according to an embodiment of the present invention. The IC 636 may pass a set of policies 912 (which may be in the form of a new rules base, a data dictionary, or other forms) preferably in a platform-neutral format (i.e. which can be read by any implementation of the system 618) 914. A loader 916 converts the policies into a platform-specific format, e.g., numbers are converted into 16-bit signed on Intel format, opcodes are stored in a more compressed format, and the like 918. The loader passes the policies to 922 ACDM 924. The ACDM 924 which may be provided, with a data dictionary 926a, a parser 926b, an opcode list 926c and the like, derives a rules base from the policy and passes it 928 to the prime implicant 932 of the analyzer 934. The prime implicant 932 uses rules of logic to reduce, reorganize and compress the rules base so that it is more efficient 936. The prime implicant 932 then passes the rules base 938 to the RTC 942. In addition to or in place of basing a rules base on information received from the IC, the ACDM 924 may use its own set of policies and statistics received 944 from the RTC to generate a new rules base and send it to the prime implicant 946.

Figure 14A:
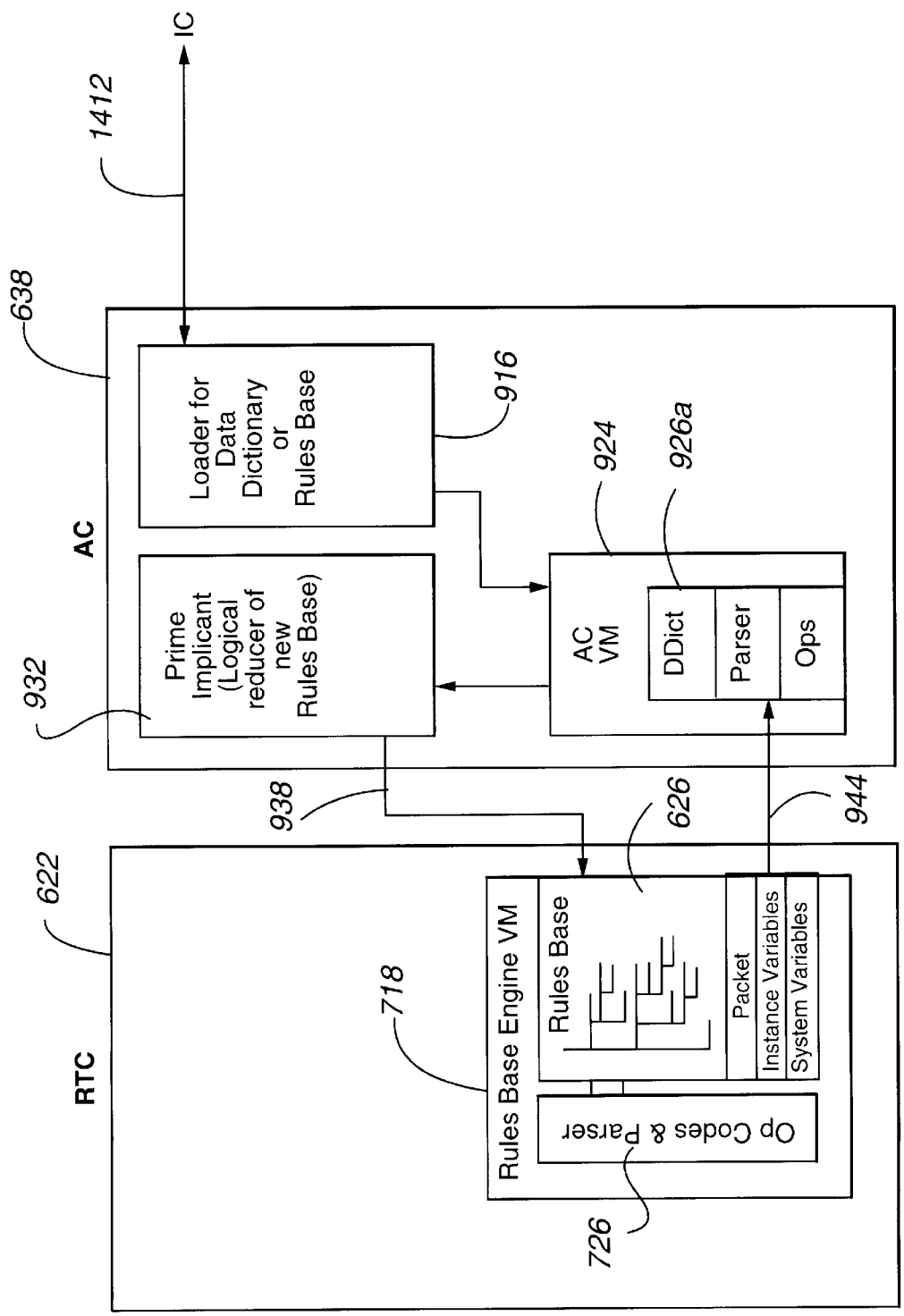
FIGS. 14A and 14B are a block diagram and a flow chart, respectively, of an embodiment of the present invention illustrating self-learning.
Figure 14B:
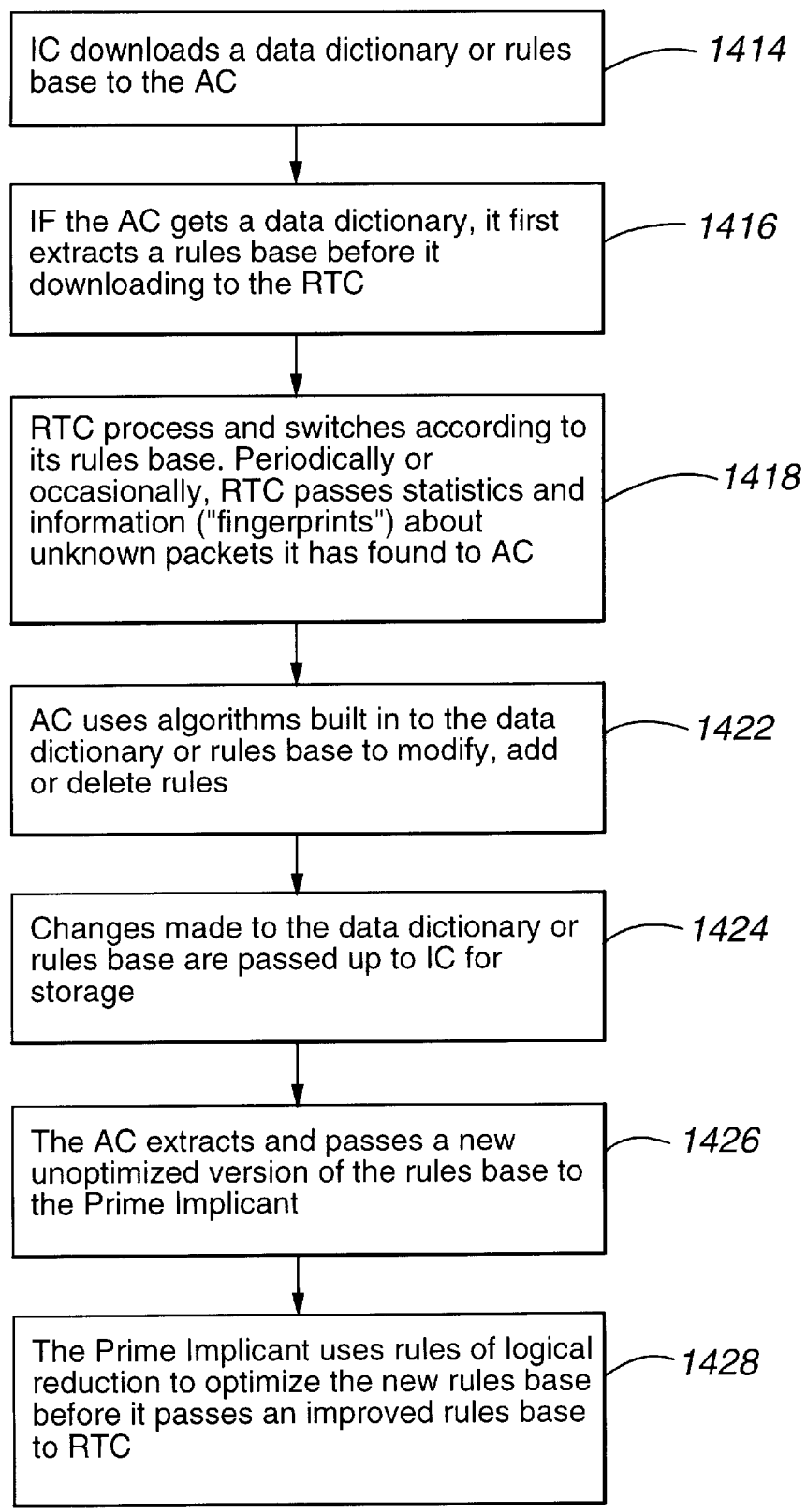

FIGS. 14a and 14b illustrate a manner of facilitating self-modification or self-learning according to an embodiment of the present invention. In the depicted embodiment, the IC downloads 1412 a data dictionary or rules base to the AC 1414. If the AC receives a data dictionary, it first extracts a rules base e.g. via the ACDM 924 before downloading to the RTC 622, 1416. The RTC 622 processes and switches according to its rules base 622. Periodically or occasionally, the RTC passes statistics 944 and/or information (fingerprints) about unknown packets it has found, to the AC 638, 1418. The AC 638 uses algorithms built into its data dictionary 926a or rules base to modify, add, or delete rules 1422. Changes made to a data dictionary or rules base are passed up 1412 to the IC for storage 1424. The AC 638 extracts and passes 1426 a new, unoptimized version of the rules base to the prime implicant 932. The prime implicant 932 uses rules of logical reduction to optimize the new rules base before it passes an approved rules base to the RTC 1428.

Figure 15:
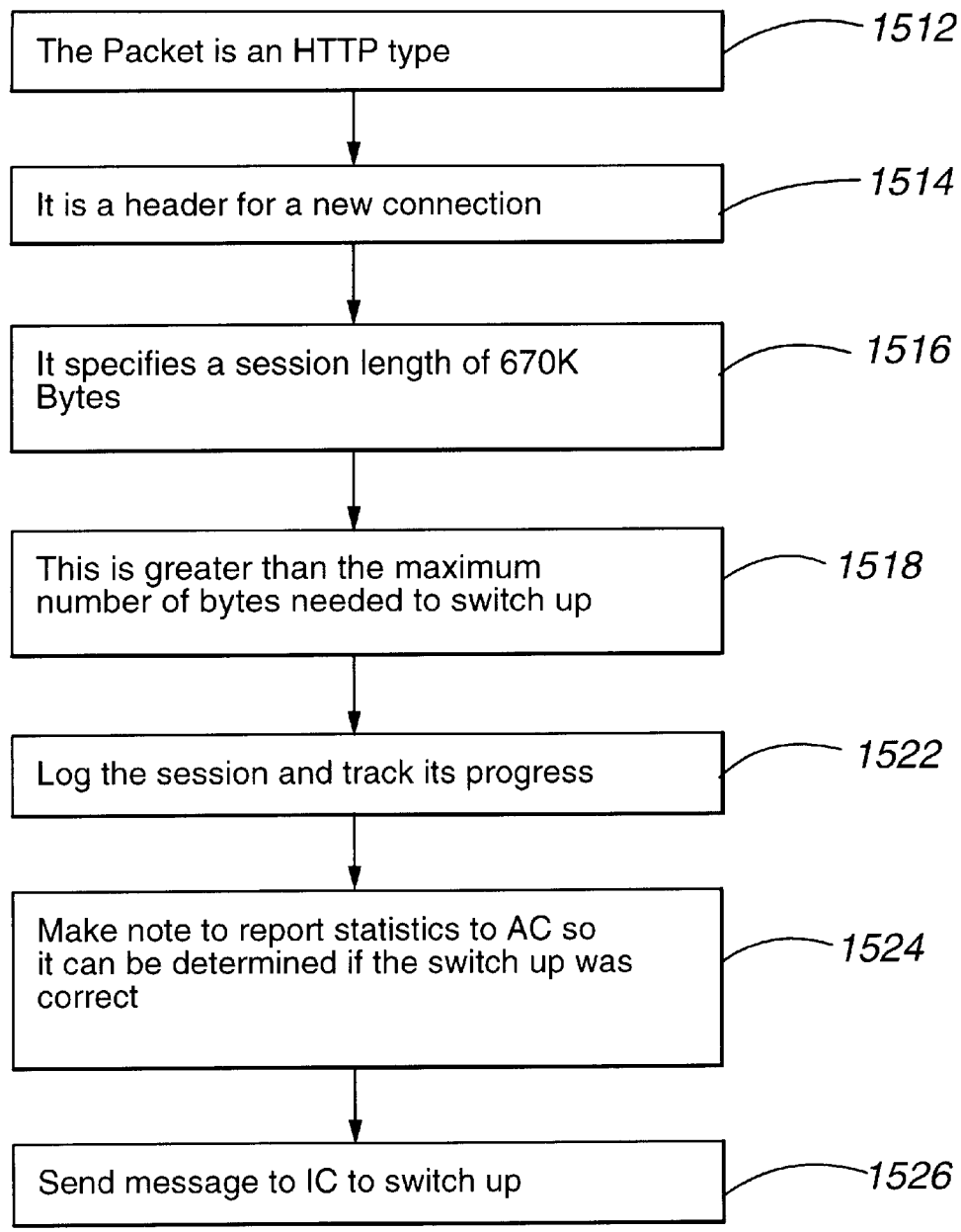
FIGS. 15 is a flow chart of an example, according to an embodiment of the present invention, involving increasing bandwidth following classification of a data stream.

FIG. 15 provides one example, of a relatively simple nature, of how a known packet may cause a switch up (or the addition of a channel). In the example of FIG. 15, the rules base 626 receives a packet and identifies the packet type of being of HTTP (hyper text transfer protocol) type 1512. The rules base determines that this packet is a header for a new connection 1514. The rules base then determines that the packet specifies a session length of 670K bytes 1516. The rules base determines that this session length is greater than the maximum number of bytes needed to switch up 1518. The session (data stream) is logged (information stored, associated with a data stream identifier) and the progress of the data stream or session is tracked 1522. The RTC makes a note (e.g. by storing data, setting a flag, and the like) to report statistics regarding this data stream and/or packet to the AC, which will assist the AC in making a determination of whether the switch up was correct (resulted in the desired data transfer effect) and/or whether the rules base should be modified 1524. The RTC will then send a message, via the AC, to the IC to switch up (add bandwidth) 1526.

Figure 16:
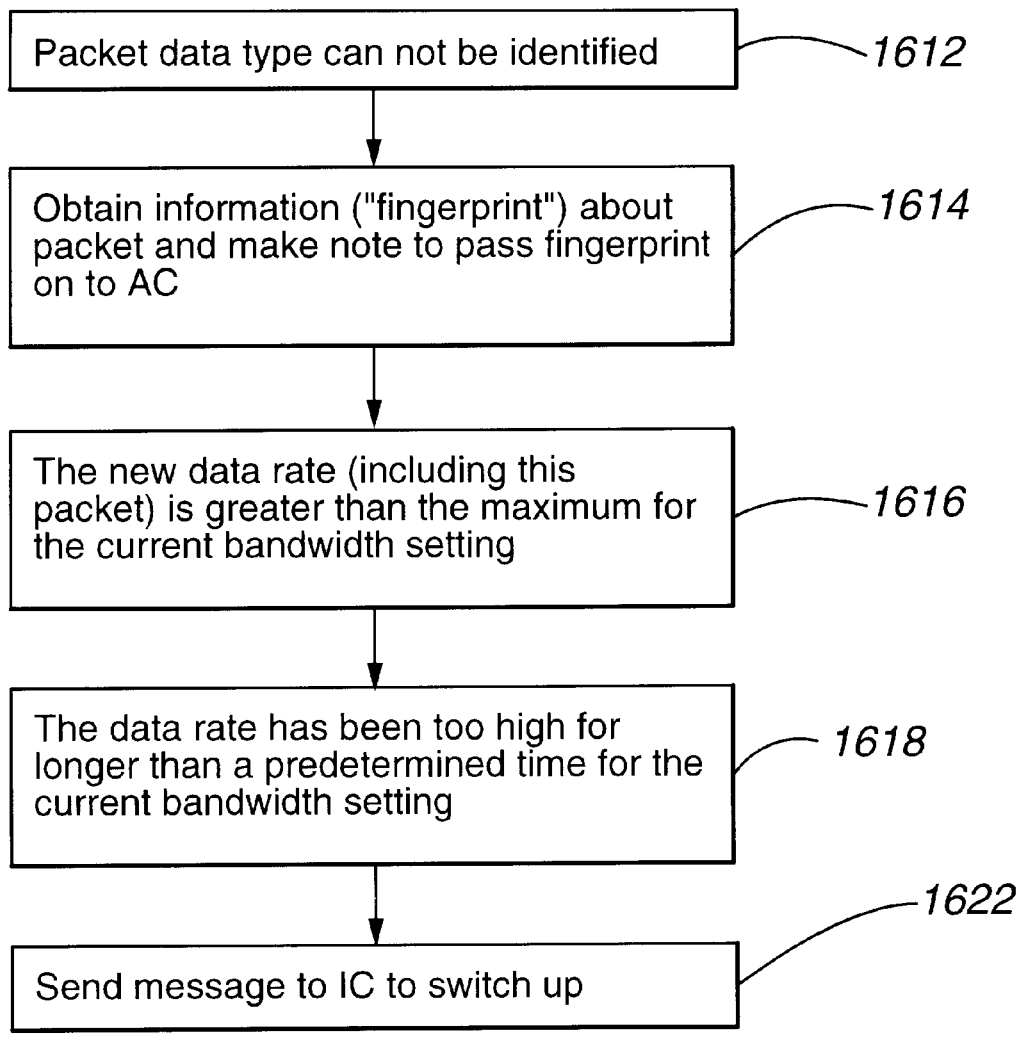
FIG. 16 is a flow chart of an example, according to an embodiment of the present invention, involving increasing bandwidth when a data stream is not identified.

FIG. 16 provides a simple example of a situation in which receipt of a packet of unknown type may result in a switch up. In the example of FIG. 16, a packet is received whose data type cannot be identified 1612. The rules base will obtain information (fingerprint) regarding this packet such as data length, associated data streams, number of packets in a stream and the like, and, as before, will make a note to pass such fingerprint information on to the AC 1614. In the depicted embodiment, there are two conditions 1616, 1618, which may cause the rules base to request a switch up. The rules base may be configured to request a switch up when either of these conditions 1616, 1618 is fulfilled, or may require that both conditions 1616, 1618 be fulfilled before requesting a switch up. In the depicted embodiment, the first condition is that the new data rate, including the new packet, is greater than the maximum data rate for the current bandwidth setting 1616. The second condition is that the data rate has been too high (exceeding a threshold) for a longer period than a predetermined time for the current bandwidth setting 1618. Depending on the configuration of the rules base, when either or both of these conditions are fulfilled, the rules base will send a message to the IC (via the AC) to switch up 1622.

Figure 17:
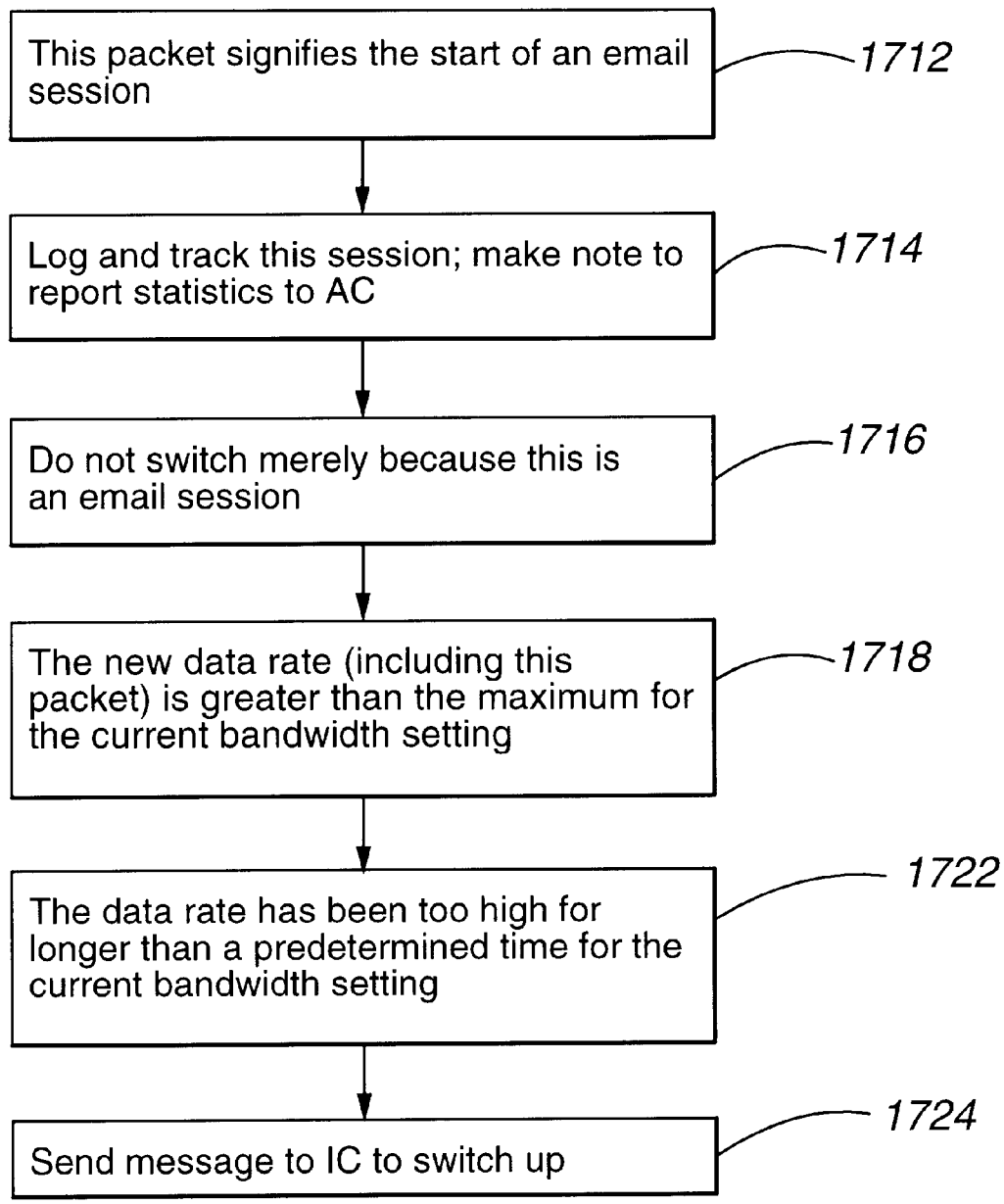
FIG. 17 is a flow chart of an example, according to an embodiment of the present invention, involving increasing bandwidth in response to data volume.

FIG. 17 illustrates an example of how an aggregation of streams may cause a switch up. In the example of FIG. 17, the rules base first identifies a packet as signifying the start of an e-mail session 1712. As before, the rules base logs and tracks this session or data stream and makes a note to report statistics to the AC 1714. The rules base determines that it should not request a switch up merely because of the data type, i.e. merely because this is an e-mail session 1716. In some configurations, the rules base may be configured such that e-mail sessions are considered non-time critical, and thus normally do not result in a switch up. In the depicted example, it is determined that the new data rate, including the new packet, is greater than the maximum for the current bandwidth setting 1718 and/or that the data rate has been too high for longer than a predetermined time for this current bandwidth setting 1722. As a result, even though the packet is identified as an e-mail packet, the rules base sends a message to the IC (via the AC) to switch up 1724.

In light of the above description, a number of advantages of the present invention can be seen. The system preferably achieves more efficient use of available bandwidth thus permitting multiple users to share B channels or other high bandwidth media. In one embodiment, the present invention can provide a ratio of users to B channels greater than about 3:1, more preferably greater than about 5:1, even more preferably greater than about 8:1 and yet more preferably greater than about 10:1. Preferably the system makes bandwidth allocation decisions based on considerations such as by considering the effect an allocation will have on a user's telecommunications charges, e.g. taking into account the current rate in variable-rate environments. The present invention is capable of accommodating changes in data traffic and is preferably is capable of automatically learning and adapting to changing conditions. The present invention can be configured to configure and/or modify a decision rules base taking into account current tariffs and other charges so as to provide high bandwidth service as needed or desired while reducing or minimizing costs to end users. The invention provides a vendor-independent mechanism for implementing and executing a bandwidth allocation decision. The same decision procedure can be run on different vendors' hardware interchangeably without modification. Such vendor independence further facilitates hardware upgrades since migration to new hardware can be achieved with little or no modification to the decision system of the present invention. In this way vendor investments in the described decision system are protected and new systems are compatible with procedures of previous systems. The present invention provides an intuitive GUI development environment and language for creating and modifying rules bases used by the system. The development environment allows vendors to fully and easily integrate any decision algorithm work that has already been done into the rules base. The rules bases themselves are preferably modular and reusable. The present invention permits rules bases to be hot loaded to the router and implemented during normal operation i.e. without taking down or re-booting routers. The present invention facilitates development and testing, as well as modifications of algorithms since the ability to achieve hot loads permits frequent downloads during testing. In one embodiment, a single administrator console can control a relatively large number of widely distributed routers simultaneously. Multiple administrator consoles can be used to manage the same group of locally and/or remotely connected routers (for example, different consoles could be used by administrators on different shifts, primary backup and tertiary consoles could be used for redundancy, or specific consoles can have responsibility for a separate portion of routers. The present invention provides advantages directly to end users by facilitating connection to the users' telephone company and ISP for ISDN usage and providing the end user with a certain level of control over his or her own ISDN usage. Although client side applications may be used, client side installation is not required thus providing a desirable degree of flexibility, openness and future-proofing. The present system preferably is compatible with any vendor hardware on remotely connected machines which supports BACP and MLPPP. The present invention provides a way to allocate bandwidth, such as ISDN bandwidth, without relying solely on queue depth, preferably using predictions of future bandwidth requirements based on data stream characteristics.

A number of variations and modifications of the system can also be used. It is possible to use some features of the invention without using others. For example, it is possible to implement a rules-based, data-stream oriented bandwidth allocation procedure without using automatic learning procedures. The present invention can involve combining datastream oriented bandwidth allocation with other approaches, such as using queue-depth of "level-of-service" allocation methods when the system is unable to (or lacks the time or other resources to) identify the data type of a data stream. In some embodiments, it may be preferable to permit aggregation of two or more data streams for purposes of allocating bandwidth for such data streams (e.g. in cases where neither of two (or more) co-existing data streams by itself justifies additional bandwidth, but overall efficiency is promoted if the aggregated data streams are provided with additional bandwidth). The present invention can be used in an environment in which there are multiple network transport media or in which there is only one network transport medium, e.g. as in an Ethernet or ADSL network. In one embodiment, the invention can be implemented using queues and assigning virtual or software channels. Although the present invention has been described in the context of an ISDN implementation, the present invention can also be applied to other telecommunications systems or media including T1, Frame Relay, ATM, Ethernet, Fiber and xDSL (e.g. by providing and using virtual channels). The present invention can be used in connection with networks that combine fiber optics, frame relay, and Ethernet, and can be used in connection with networks that have only one type of medium (e.g. using virtual or software channels). Although it is believed that features such as modularization, real time segregation, byte code, decision flagging and the like, contribute to efficient execution, it is possible to implement an operable system which does not include one or more of these items. Although certain features of the present invention were described in the context of ISP usages, the present invention can be implemented in a number of other contexts. For example, for remote network access, the system can reside on a remote access router (e.g. owned by a company which uses ISDN to connect outside users to that router). The system can precisely allocate bandwidth in e.g., a corporate environment for accommodating telecommuters (whose data transactions tend to be sporadic and patterned). The present invention can be used in connection with router-to-router connections. For example, point of sale systems in satellite stores connecting to a central site. The present invention may permit routers e.g. at satellite locations, to remain constantly connected to headquarters over switched connections without incurring incremental charges, even over long-haul lines. In such a system, low level throughput (such as price checks, credit card authorizations and the like) can take place over the always-on low-bandwidth D channels, with high level transactions such as price file transfers, coupon downloads, store transactions, summary uploads and the like utilizing additional bandwidth as needed on demand.

Although an embodiment of the present invention can be provided in the C language and/or using known artificial intelligence language principals such as those of Prolog, it is possible to implement the present invention using other programming languages and approaches.

Although the present invention has been described by way of preferred embodiments and certain variations and modifications, other variations and modifications can also be used, the invention being defined by the following claims.

What is claimed is:

1. A computer-implemented process, in a telecommunications system for switching at least some data in a telecommunications stream, comprising:

identifying a first characteristic of said stream, wherein said characteristic is at least partially predictive of likely data size of said stream;

deciding, based on at least said first characteristic, whether to switch at least some of said data in said stream so as to provide different data transmission properties, wherein said deciding is performed using a first stored rules base;

automatically evaluating the effectiveness of said step of deciding.

2. A process, as claimed in claim 1, further comprising modifying said rules base, based on said step of evaluating.

3. A process, as claimed in claim 2, wherein said step of modifying said rules base is performed automatically, to provide a self-learning computer implemented telecommunications switching process.

4. A process, as claimed in claim 1, wherein said step of deciding is implemented using a pegboard process.

5. A process, as claimed in claim 1, wherein said step of evaluating comprises evaluating both cost and level of service.

6. A method, as claimed in claim 1, wherein said different data transmission property is selected from the group consisting of different bandwidth properties and different effective data transmission speed properties.

* * * * *